US 8,326,372 B2

(12) United States Patent
Raissinia

(10) Patent No.: US 8,326,372 B2
(45) Date of Patent: Dec. 4, 2012

(54) DIRECT LINK SET-UP POWER SAVE DELIVERY

(75) Inventor: Alireza Raissinia, Monte Sereno, CA (US)

(73) Assignee: QUALCOMM Incorporated, San Diego, CA (US)

( * ) Notice: Subject to any disclaimer, the term of this patent is extended or adjusted under 35 U.S.C. 154(b) by 811 days.

(21) Appl. No.: 12/266,463

(22) Filed: Nov. 6, 2008

(65) Prior Publication Data

US 2009/0124301 A1    May 14, 2009

Related U.S. Application Data

(60) Provisional application No. 60/987,007, filed on Nov. 9, 2007.

(51) Int. Cl.
*H04M 1/00* (2006.01)
*H04B 1/38* (2006.01)

(52) U.S. Cl. .................. 455/572; 455/574; 370/311

(58) Field of Classification Search .................. 455/572, 455/574; 370/311
See application file for complete search history.

(56) References Cited

U.S. PATENT DOCUMENTS 6,990,362 B2 *   1/2006  Simpson et al. ............. 455/574
7,551,948 B2     6/2009  Meier et al.
2004/0264396 A1 * 12/2004 Ginzburg et al. ............ 370/311
2005/0094588 A1   5/2005  Wentink
2006/0126531 A1   6/2006  Myojo et al.
2007/0230418 A1  10/2007  Takeuchi et al.

FOREIGN PATENT DOCUMENTS

WO   WO2004077718 A2   9/2004
WO   WO2005067535      7/2005

OTHER PUBLICATIONS

International Search Report & Written Opinion—PCT/US2008/082907, International Search Authority—European Patent Office, Nov. 1, 2006.

* cited by examiner

*Primary Examiner* — John Poos
(74) *Attorney, Agent, or Firm* — Kevin T. Cheatham

(57) ABSTRACT

Systems and methodologies are described that enable power save mechanisms to be utilized with active direct transfers. Mobile stations in a wireless communication network can establish direct links between each other to obviate a need to transfer data via an access point. While direct links are active, the mobile stations coordinate or otherwise notify each other about power management modes to effectuate power save delivery of data via direct links. In accordance with a scheduled mechanism, mobile stations coupled via a direct link enter an active mode at a previously negotiated scheduled time after which time data transfer can occur. According to an unscheduled mechanism, one mobile station can remain awake while other enters a power save mode. The sleeping station can awaken and transmit a trigger frame to notify its peer that it is available for data transfers.

24 Claims, 16 Drawing Sheets

US 8,326,372 B2

DIRECT LINK SET-UP POWER SAVE DELIVERY

CROSS-REFERENCE TO RELATED APPLICATIONS

This application claims the benefit of U.S. Provisional Patent application Ser. No. 60/987,007 entitled "DIRECT LINK SET-UP (DLS) POWER SAVE METHOD AND APPARATUS" which was filed Nov. 9, 2007. The entirety of the aforementioned application is herein incorporated by reference.

BACKGROUND

I. Field

The following description relates generally to wireless communications, and more particularly to employing power save delivery mechanisms with direct link set-up connections.

II. Background

Wireless communication systems are widely deployed to provide various types of communication content such as, for example, voice, data, and so on. Typical wireless communication systems can be multiple-access systems capable of supporting communication with multiple users by sharing available system resources (e.g., bandwidth, transmit power, . . . ). Examples of such multiple-access systems can include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP2, 3GPP long-term evolution (LTE), etc.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations can be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

Wireless communication systems can employ one or more base stations or access points that provide a coverage area. A typical base station can transmit multiple data streams for broadcast, multicast and/or unicast services, wherein a data stream can be a stream of data that can be of independent reception interest to an access terminal. An access terminal within the coverage area of such base station can be employed to receive one, more than one, or all the data streams carried by the composite stream. Likewise, an access terminal can transmit data to the base station or another access terminal.

In addition, wireless communication system can include network such as wireless wide area networks (WWANs) that provide communication coverage for large geographic areas (e.g., cities), wireless local area networks (WLANs) that provide communication coverage for medium-size geographic areas (e.g., buildings and campuses), and wireless personal area networks (WPANs) that provide communication coverage for small geographic areas (e.g., homes). A wireless network typically includes one or more access points (or base stations) that support communication for one or more user terminals (or wireless devices).

IEEE 802.11 is a family of standards developed by The Institute of Electrical and Electronics Engineers (IEEE) for WLANs. These standards specify an over-the-air interface between an access point and a user terminal or between two user terminals. IEEE Std 802.11, 1999 Edition (or simply, "802.11"), which is entitled "Part 11: Wireless LAN Medium Access Control (MAC) and Physical Layer (PHY) Specifications," supports data rates of 1 and 2 mega bits/second (Mbps) in the 2.4 giga Hertz (GHz) frequency band using either frequency hopping spread spectrum (FHSS) or direct sequence spread spectrum (DSSS). IEEE Std 802.11a-1999 (or simply, "802.11a") is a supplement to 802.11, uses orthogonal frequency division multiplexing (OFDM) instead of FHSS or DSSS, and supports data rates of up to 54 Mbps in the 5 GHz frequency band. IEEE Std 802.11b-1999 (or simply, "802.11b") is another supplement to 802.11 and uses DSSS to support data rates of up to 11 Mbps. IEEE Std 802.11g-2003 (or simply, "802.11g") is yet another supplement to 802.11, uses DSSS and OFDM, and supports data rates of up to 54 Mbps in the 2.4 GHz band. These various standards are well known in the art and publicly available.

The lowest data rate supported by 802.11, 802.11a, 802.11b and 802.11g is 1 Mbps. For 802.11b and 802.11g (or simply, "802.11b/g"), a specific DSSS scheme and a specific modulation scheme are used to send a transmission at the lowest data rate of 1 Mbps. The DSSS and modulation schemes for 1 Mbps require a certain minimum signal-to-noise-and-interference ratio (SNR) for reliable reception of the transmission. The range of the transmission is then determined by the geographic area within which a receiving station can achieve the required SNR or better.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in regard to enabling power save mechanisms to be utilized with active direct transfers. Mobile stations in a wireless communication network can establish direct links between each other to obviate a need to transfer data via an access point. While direct links are active, the mobile stations coordinate or otherwise notify each other about power management modes to effectuate power save delivery of data via direct links. In accordance with a scheduled mechanism, mobile stations, coupled via a direct link, enter an active mode at a previously negotiated scheduled time after which time data transfer can occur. According to an unscheduled mechanism, one mobile station can remain awake while another enters a power save mode. The sleeping station can awaken and transmit a trigger frame to notify its peer that it is available for data transfers.

According to an aspect, a method that facilitates power save direct data transfers in a wireless communication system is described. The method can comprise transitioning to an active mode from a power save mode at a scheduled time relative to a reference point. The method can also include performing at least one of a transmission of one or more data frames to a direct link peer or a reception of one or more data frames from a direct link peer. Further, the method can comprise receiving an end of service period indication. In addition, the method can include reentering the power save mode.

Another aspect relates to an apparatus that enables power save modes during active direct transfers. The apparatus can include a direct link set-up module that establishes a direct link with at least one mobile station. The apparatus can also comprise a power management module that manages a power management mode of the apparatus; the power management module transitions the apparatus from a power save mode to an active mode at a scheduled time. Further, the apparatus can include a scheduled power save delivery module. The scheduled power save delivery module can enable, at the scheduled time, at least one of a transmission of one or more data frames to the at least one mobile station via the direct link or a reception of one or more data frames from the at least one mobile station via the direct link.

Yet another aspect relates to a wireless communications apparatus that facilitates scheduling direct transfers to enable power save. The wireless communications apparatus can comprise means for transitioning to an active mode from a power save mode at a scheduled time relative to a reference point. The wireless communications apparatus can also include means for performing at least one of a transmission of one or more data frames to a direct link peer or a reception of one or more data frames from a direct link peer. In addition, the wireless communications apparatus can comprise means for reentering the power save mode.

Still another aspect relates to a computer program product, which can have a computer-readable medium. The computer-readable medium can include code for causing at least one computer to switch to an active mode from a power save mode at a scheduled time relative to a reference point. The computer-readable medium can also comprise code for causing the at least one computer to transmit one or more data frames to a direct link peer. In addition, the computer-readable medium can include code for causing the at least one computer to receive one or more data frames from a direct link peer. Further, the computer-readable medium can include code for causing the at least one computer to receive an end of service period indication. The computer-readable medium can also comprise code for causing the at least one computer to reenter the power save mode upon receipt of the end of service period indication.

Another aspect relates to an apparatus in a wireless communication system. The apparatus can comprise a processor configured to switch to an active mode from a power save mode at a scheduled time relative to a reference point. The processor can also be configured to transmit one or more data frames to a direct link peer. The processor can further be configured to receive one or more data frames from a direct link peer. Further, the processor can be configured to receive an end of service period indication. In addition, the processor can be configured to reenter the power save mode upon receipt of the end of service period indication.

Another aspect described herein relates to a method that facilitates maintaining active direct transfers during power save. The method can include transitioning to an active mode from a power save mode. The method can also comprise sending a trigger frame to at least one direct link peer. In addition, the method can also include receiving one or more data frames from the at least one direct link peer.

Still yet another aspect described herein relates to an apparatus that enables power save modes during active direct transfers. The apparatus can comprise a direct link set-up module that establishes a direct link with at least one mobile station. The apparatus can also include a power management module that manages a power management mode of the apparatus; the power management module transitions the apparatus from a power save mode to an active mode. Further, the apparatus can comprise an unscheduled power save delivery module that facilitates sending a trigger frame to the at least one mobile station via the direct link upon transition to the active mode. The unscheduled power save delivery module enables at least one of a transmission of one or more data frames to the at least one mobile station via the direct link or a reception of one or more data frames from the at least one mobile station via the direct link.

A further aspect described herein relates to a wireless communications apparatus that facilitates maintaining active direct transfers during power save. The wireless communications apparatus can comprise means for transitioning to an active mode from a power save mode. The wireless communications apparatus can further include means for sending a trigger frame to at least one direct link peer. The wireless communications apparatus can also include means for receiving one or more data frames from the at least one direct link peer. Further, the wireless communications apparatus can comprise means for receiving an end of service period indication from the direct link peer. In addition, the wireless communications apparatus can include means for transitioning from the active mode to the power save mode upon reception of the end of service period indication.

Still another aspect relates to a computer program product, which can have a computer-readable medium that includes code for causing at least one computer to switch a power management mode to an active mode from a power save mode. The computer-readable medium can also comprise code for causing the at least one computer to transmit a trigger frame to at least one direct link peer. The computer-readable medium can include code for causing the at least one computer to obtain one or more data frames from the at least one direct link peer. Further, the computer-readable medium can comprise code for causing the at least one computer to receive an end of service period indication from the direct link peer. In addition, the computer-readable medium can include code for causing the at least one computer to return the power management mode to a power save mode reception of the end of service period indication.

Yet another aspect relates to an apparatus in a wireless communications system that includes a processor configured to switch a power management mode to an active mode from a power save mode. The processor can further be configured to transmit a trigger frame to at least one direct link peer. The processor can also be configured to obtain one or more data frames from the at least one direct link peer. Further, the processor can be configured to receive an end of service period indication from the direct link peer. In addition, the processor can be configured to return the power management mode to a power save mode reception of the end of service period indication.

According to another aspect, a method that facilitates power save operations during active direct transfers during power save is provided. The method can comprise receiving a trigger frame from a direct link peer transitioning from a power save mode. The method can also include transmitting one or more data frames to the direct link peer. In addition, the method can comprise conveying an end or service period indicator to the direct link peer upon at least one of an expiration of a maximum service period or a complete transmission of buffered data frames.

Another aspect relates to a wireless communications apparatus that can comprise a memory. The memory can retain instructions related to receiving a trigger frame from a direct link peer transitioning from a power save mode. The memory can further include instructions related to transmitting one or more data frames to the direct link peer. In addition, the memory can also retain instructions related to conveying an end or service period indicator to the direct link peer upon at least one of an expiration of a maximum service period or a complete transmission of buffered data frames. The apparatus can also include a processor, coupled to the memory, configured to execute the instructions retained in the memory.

Yet another aspect relates to a wireless communications apparatus that facilitates maintaining active direct transfers during power save. The wireless communications apparatus can include means for receiving a trigger frame from a direct link peer transitioning from a power save mode. The wireless communications apparatus can also comprise means for transmitting one or more data frames to the direct link peer. In addition, the wireless communications apparatus can include means for conveying an end or service period indicator to the direct link peer upon at least one of an expiration of a maximum service period or a complete transmission of buffered data frames.

Still yet another aspect relates to a computer program product, which can have a computer-readable medium. The computer-readable medium can comprise code for causing at least one computer to receive a trigger frame from a direct link peer transitioning from a power save mode. The computer-readable medium can also include code for causing the at least one computer to transmit one or more data frames to the direct link peer, the one or more data frames are transmitted in association with a more data indication that specifies if additional data is waiting to be transmitted. Further, the computer-readable medium can include code for causing the at least one computer to receive at least one data frame from the direct link peer after acknowledgment of the trigger frame. In addition, the computer-readable medium can comprise code for causing the at least one computer to convey an end or service period indicator to the direct link peer upon at least one of an expiration of a maximum service period or a complete transmission of buffered data frames.

Another aspect relates to an apparatus in a wireless communications system. The apparatus can comprise a processor configured to receive a trigger frame from a direct link peer transitioning from a power save mode. The processor can also be configured to transmit one or more data frames to the direct link peer. In addition, the processor can be configured to convey an end or service period indicator to the direct link peer upon at least one of an expiration of a maximum service period or a complete transmission of buffered data frames.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
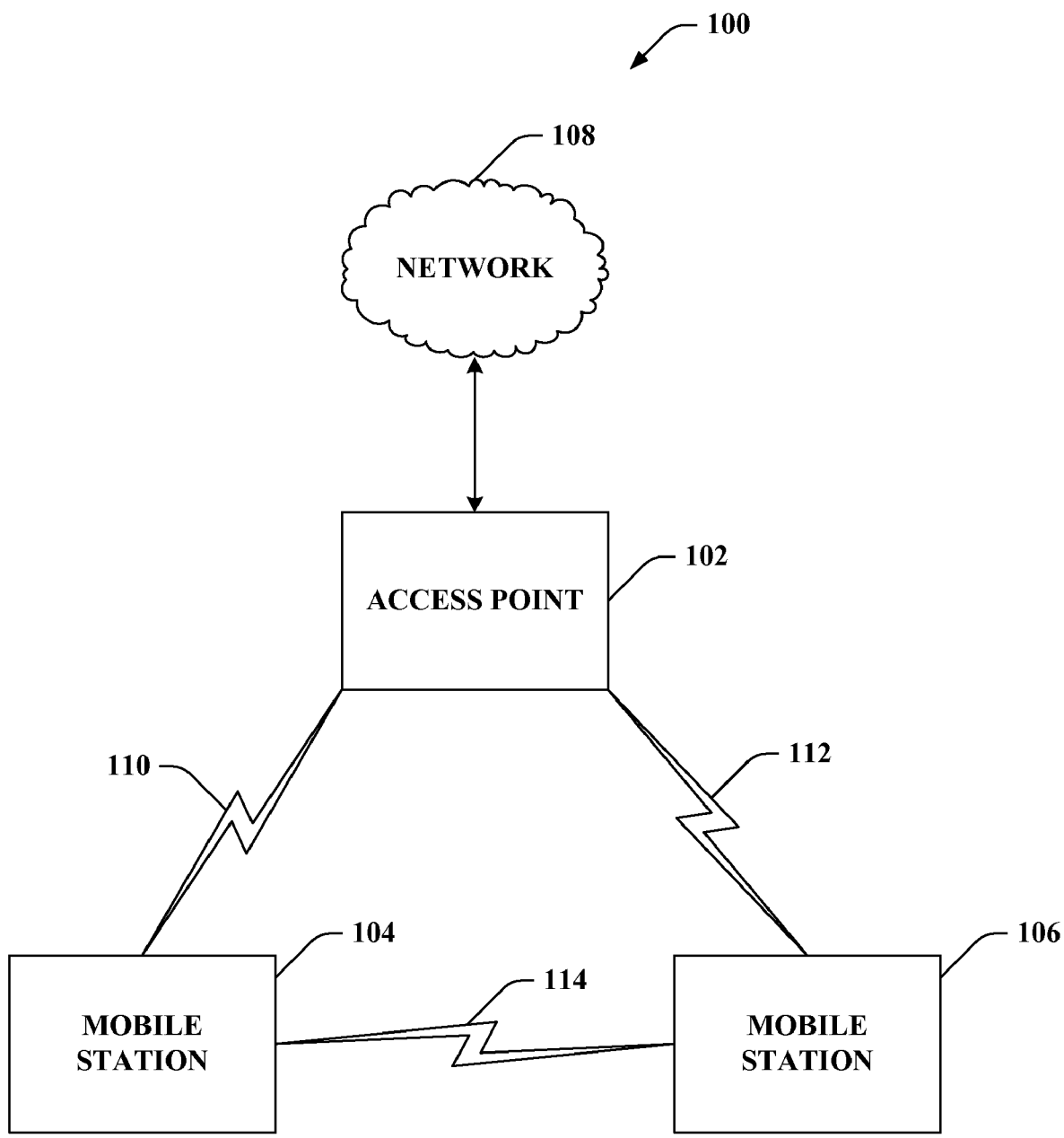
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, evolved Node B (eNode B or eNB), base transceiver station (BTS) or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include, but are not limited to, magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

The techniques described herein can be used for various wireless communication systems such as code division multiple access (CDMA), time division multiple access (TDMA), frequency division multiple access (FDMA), orthogonal frequency division multiple access (OFDMA), single carrier frequency domain multiplexing (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2).

Referring now to FIG. 1, a wireless communications system 100 is illustrated in accordance with various embodiments presented herein. The system 100 can include a basic service set (BSS) that includes at least one access point 102 that serves one or more mobile stations such as mobile station 104 and mobile station 106. While FIG. 1 depicts only two mobile stations (e.g., mobile stations 104 and 106), it is to be appreciated that any number of mobile stations can be employed in connection with wireless communications system 100. Moreover, it is to be appreciated that system 100 can include additional access points beyond the depicted access point 102. In one aspect, access point 102 can be, for example, a wireless router that is equipped with a transceiver that transmits and receives data in accordance with and compliant with a communication standard, such as IEEE 802.11.

Access point 102 can additionally include transmitter chains and receiver chains, each of which can in turn comprises a plurality of components associated with signal transmission and reception (e.g., processors, modulators, multiplexers, demodulators, demultiplexers, antennas, etc.), as will be appreciated by one skilled in the art. Access point 102 can communicate with mobile stations 104 and 106; however, it is to be appreciated that access point 102 can communicate with substantially any number of mobile devices similar to mobile stations 104 and 106. The mobile stations 104 and 106 can also be referred to as user terminals, mobile terminals, stations or STAs herein. Pursuant to an illustrative embodiment, access point 102 and mobile stations 104 and 106 can communicate via a wireless local area network (WLAN). According to one or more aspects, the WLAN can be a high speed multiple-input, multiple output (MIMO) OFDM system; however, the WLAN can be any wireless system. Access point 102 can communicate with a plurality of external devices or processes via network 108. Network 108 can be the Internet, an intranet, or any other wired, wireless, or optical network. A connection can carry signals from the network 108 to the access point 102 and vice versa. Devices or processes can be communicatively coupled to network 108 or, as with mobile stations 104 and 106, on the WLAN. Examples of devices that can be connected to either network 108 or WLAN include cellular phones, smart phones, laptops, handheld communication devices, handheld computing devices, satellite radios, global positioning systems, PDAs, media devices such as HDTV, DVD player, wireless speakers, cameras, camcorders, webcams, and/or any other suitable device for communicating over wireless communication system 100. Processes can include voice, video, data communications, etc. Various data streams can have varying transmission requirements, which can be accommodated by using varying Quality of Service (QoS) techniques.

System 100 can be deployed with the centralized access point 102. Pursuant to an illustration, mobile stations, such as mobile stations 104 and 106 can communicate with the access point 102. In addition, the mobile stations 102 and 104 can communicate via direct peer-to-peer communication (e.g., employing direct link set-up (DLS))

In accordance with an aspect, a direct link set-up (DLS) power save delivery (DPSD) mechanism can be employed with system 100. The mobile stations 104 and 106 can communicate with the access point 102 through a communications channel, such as wireless links 110 and 112, respectively. The mobile stations 104 and 106 can be, for example, a cell phone, a laptop computer, a mobile consumer electronic device, a smart phone, pocket PC or other wireless communications apparatus, that is equipped with a transceiver that transmits and receives data in accordance with and compliant with a communication standard, such as IEEE 802.11. Moreover, mobile stations can communicate directly with other stations through a communication channel, such as wireless link 114 between mobile station 104 and mobile station 106. The direct communication can employ a DLS mechanism that enables mobile stations to communicate with each other without routing data through access point 102. DLS mechanisms enable direct data transfer between non-access point QoS stations in a basic service set. DLS can improve traffic efficiency by increasing throughput and decreasing delay. It is noted that frames need not be routed through the access point 102. DLS includes link set-up before a data session begins and also link tear-down after a data session is completed.

Mobile stations 104 and 106 can employ a beacon power save mode that facilitates conserving power during periods of inactivity. Typically, only access point 102 is aware of sleep states of mobile stations 104 and 106. For instance, the access point is aware of which mobile stations are awake and which are asleep. DLS can be difficult to maintain as mobile stations are not typically aware of sleep states of peers. However, as described infra, the mobile station 104 and 106 can employ DLS power save delivery mechanisms to maintain DLS data transfers while conserving power through Beacon power save. For instance, in one aspect, both mobile stations 104 and 106 can negotiate a scheduled time at which both stations can awaken to transfer data. According to another aspect, one mobile station can remain awake while another sleeps. The sleeping mobile station can transmit a trigger frame to the always awake mobile station upon waking to enable data transfer there between.

Example embodiments are disclosed herein that support employing DLS power save delivery to effectuate coalescence of DLS techniques and beacon power save operation. Various example embodiments preserve the simplicity and robustness of legacy WLAN systems, examples of which are found in 802.11(a-z). The advantages of the various embodiments may be achieved while maintaining backward compatibility with such legacy systems. In the description below, 802.11 systems are described as example legacy systems. Those of skill in the art will recognize that the improvements are also compatible with alternate systems and standards. In addition, it is to be appreciated that aspects described herein can be implemented in other wireless communications system other than 802.11 systems to enable direct communication and power save modes in a centralized wireless system.

Figure 2:
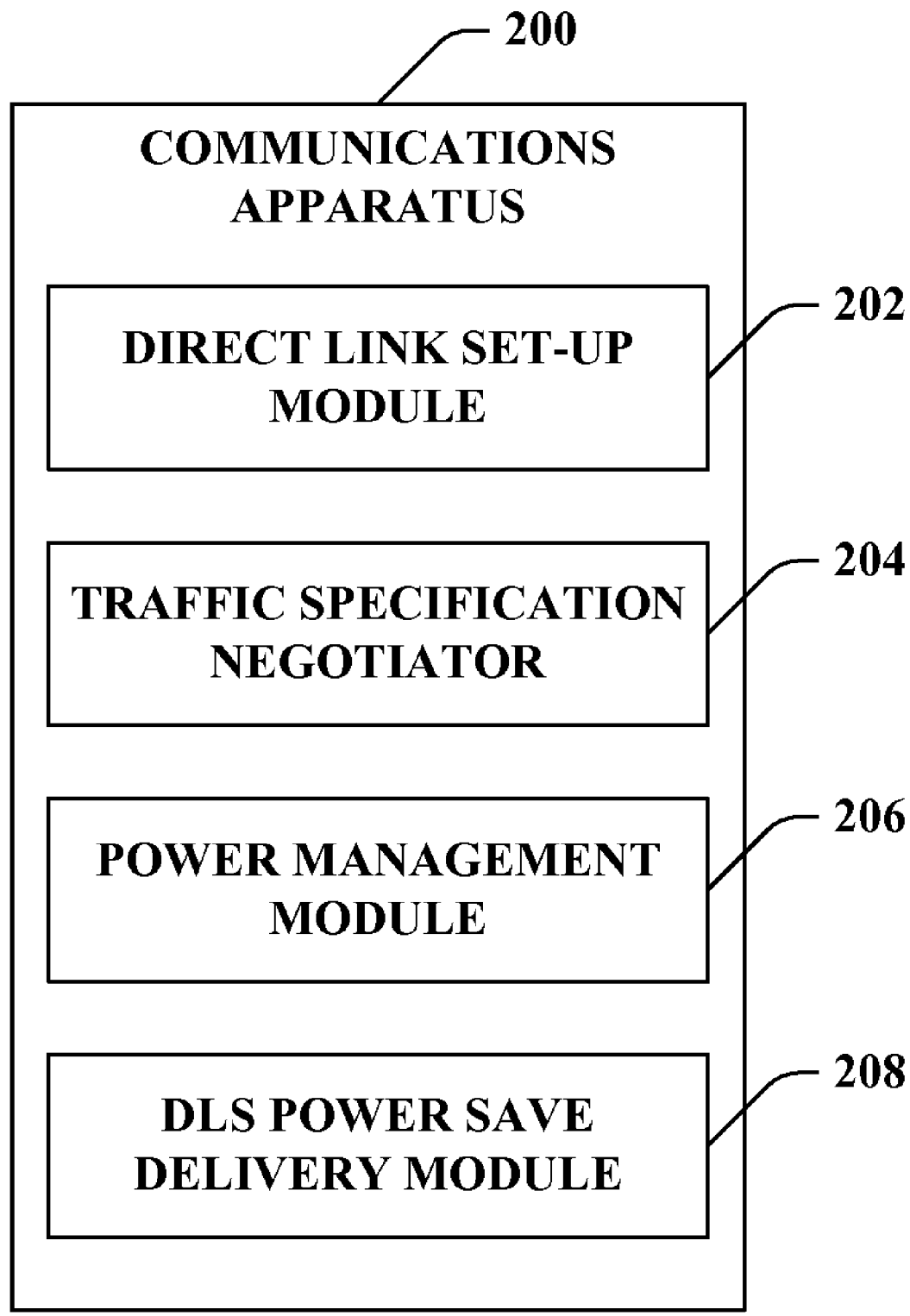
FIG. 2 is an illustration of an example communication apparatus that facilitates direct link set-up (DLS) power save delivery.

Turning to FIG. 2, illustrated is a communications apparatus 200 for employment within a wireless communications environment. For instance, communications apparatus 200 can be a mobile station or portion thereof such as mobile stations 104 and 106 described with reference to FIG. 1. The communications apparatus 200 can include a direct link set-up (DLS) module 202 that facilitates establishment of direct links between communications apparatus and any other non-access point communications apparatus (not shown). Direct links enable data to be directly communicated from one apparatus to another apparatus without having to be routed through a centralized access point. The DLS module 202 can set-up or establish a direct link before a data session commences. In addition, the DLS module 202 can maintain the direct link during the data session and, further, tear-down or destroy the direct link upon completion of the data session. Pursuant to an illustration, the DLS module 202 can establish a direct link with a peer via negotiation through an access point (not shown).

The communications apparatus 200 can further include a traffic specification negotiator 204 that facilitates negotiating and generating traffic specifications (TPSECs). A traffic specification or TPSEC describes traffic characteristics and quality of service (QoS) requirements of a traffic or data stream. In addition, the TPSEC can also be employed to reserve resources (e.g., transmission opportunities) with a hybrid coordinator according to a hybrid coordination function (HCF) controlled channel access (HCCA) mechanism. Further, the TPSEC can specify additional parameters associated with a traffic stream such as, but not limited to, a traffic classifier and/or acknowledgement policy. After successful negotiation of the TPSEC, a traffic stream can be created in accordance therewith.

In a centralized scheme, communications apparatus 200 transmits data to an access point (not shown). Since traffic from communications apparatus 200, other apparatuses and/or mobile stations is facilitated by an access point, a power save mode is available. The communications apparatus 200 can enter into a power save mode (e.g., enter into a sleep mode) and conserve power (e.g., battery power) during periods of inactivity. In the centralized scheme, an access point can buffer frames or transmissions intended for communications apparatus 200. Periodically, based at least in part on a beacon interval, the access point can notify the communications apparatus 200 that data is waiting to be sent on a downlink stream. The access point is aware of times when the communications apparatus 200 transitions out of a power save mode (e.g., wakes from sleep), and thus can appropriately synchronize such notifications.

Pursuant to an aspect, the communications apparatus 200 can include a power management module 206 that facilitates power management and/or conservation. The power management module 206 can configure a power management mode of the communications apparatus 200. For instance, the power management module 206 can change the power management state or mode of the communications apparatus 200 from an awake or active mode to a sleep or power save mode. In addition, the power management mode 206 can transition the communications apparatus 200 from a sleep mode to an active mode. The power management module 206 can notify an access point of a change in power management mode. While the communications apparatus 200 is in a power save mode, the access point does not arbitrarily transmit data to the communications apparatus 200. Rather, the access point can transmit at designated times. In addition, the communications apparatus 200 in a power save mode listens for beacons generated by an access point. For instance, the power management module 206 can awaken the communications apparatus 200 temporarily to enable the apparatus 200 to listen for the beacons. The communications apparatus 200 can determine if the access point retains buffered data by receiving and analyzing a traffic indicator map that, in part, identifies mobile stations associated with buffered data waiting for transmission.

Direct links can be established with DLS. Typically, a mobile station, such as communications apparatus 200, is prohibited from entering power save mode while active DLS links persist. For instance, in power save mode, an access point is aware that a mobile station is sleeping but DLS peers are not. The communications apparatus 200 includes a DLS power save delivery (DPSD) module 208 that facilitates direct data transfers between the communications apparatus 200 and other mobile station peers while enabling employment of power save mode. In accordance with one aspect, the DLS power save delivery module 208 can effectuate a schedule that enables the communications apparatus 200 and DLS peers to coordinate a wake-up time. Pursuant to an example, the traffic specification negotiation 204 can include additional parameters in a traffic specification that indicate the coordinated wake-up time. Upon waking up, the communications apparatus 200 and DLS peers can transfer data, either unidirectionally or bidirectionally, before returning to a power save or sleep mode. In addition, pursuant to another illustration, an unscheduled delivery approach can be utilized. In an unscheduled delivery approach, one peer can remain awake while another sleeps. For example, one peer can include active data transfers with another DLS peer or an access point while the other peer is inactive. When a sleeping peer awakens, a trigger frame is sent to notify others. An always-awake peer can transmit buffered data to the waking peer upon receipt of the trigger frame.

Figure 3:
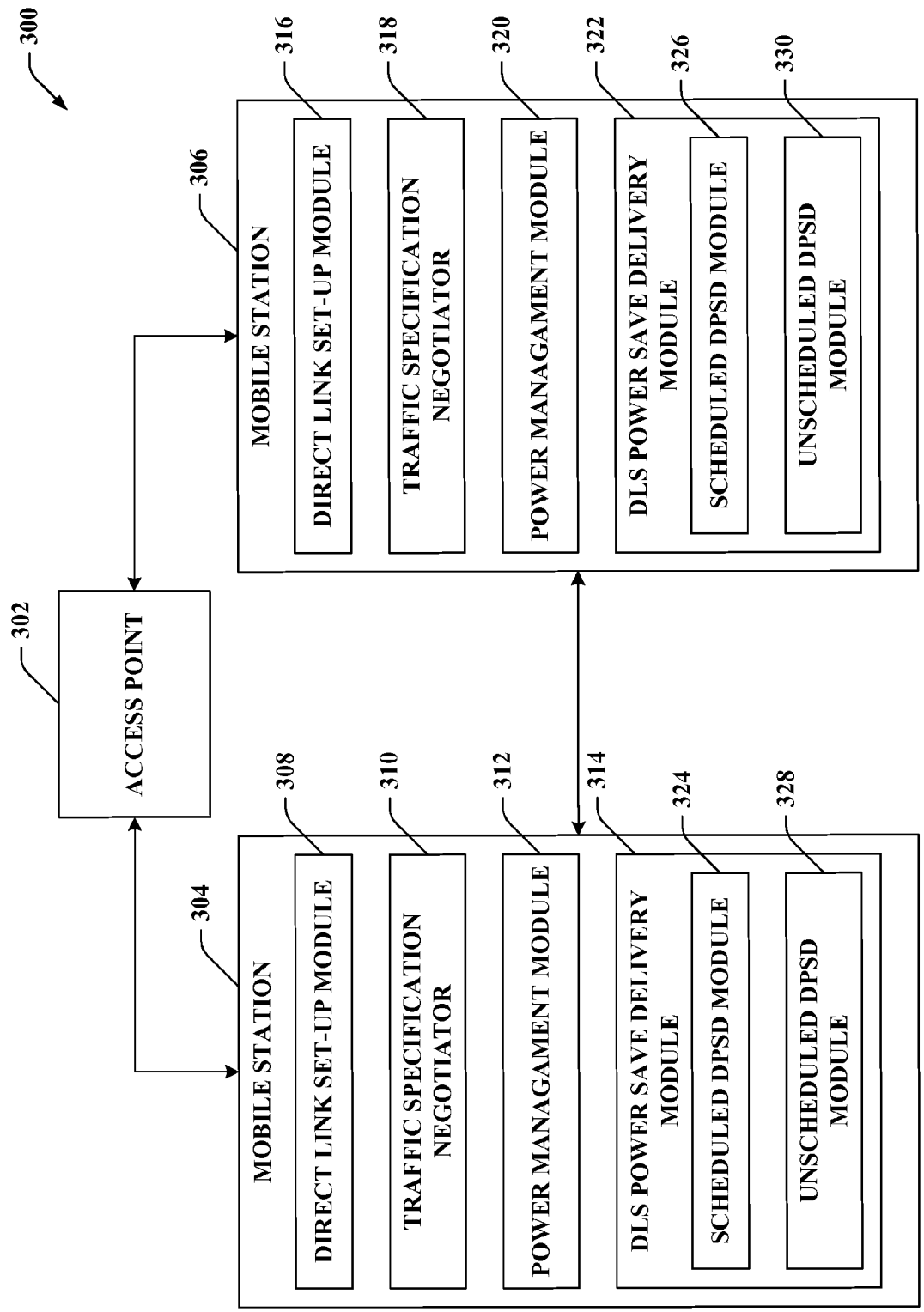
FIG. 3 is an illustration of an example wireless communications system that facilitates conserving power while maintaining DLS connections.

Now referring to FIG. 3, illustrated is a wireless communications system 300 that can facilitate conserving power while maintaining DLS connections. The system 300 includes an access point 302 that can communicate with a mobile station 304, a mobile station 306, and/or any number of disparate devices (not shown). The access point 302 can transmit information to the mobile station 304 and the mobile station 306 over forward link or downlink channels; further access point 302 can receive information from the mobile station 304 and/or the mobile station 306 over reverse link or uplink channels. Moreover, system 300 can be a MIMO system. Additionally, the system 300 can operate in an OFDMA wireless network (such as 3GPP, 3GPP2, 3GPP LTE, etc., for example) and/or an 802.11 wireless network.

The mobile station 304 can include a direct link set-up (DLS) module 308 that facilitates creation, maintenance and destruction of direct links via DLS between mobile station 304 and any other mobile station, such as, but not limited to mobile station 306. In addition, the mobile station 304 can include a traffic specification (TPSEC) negotiator 310 that facilitates negotiating and generating traffic specifications (TPSECs) for traffic or data streams between mobile station 304 and access point 302, between mobile station 304 and mobile station 306, and/or between mobile station 304 and any other wireless communication devices (not shown). Moreover, the mobile station 304 can include a power management module 312 that facilitates power management for the mobile station 304 (e.g., switch power management modes between active and power save). The mobile station 304 can further include a DLS power save delivery (DPSD) module 314 that enables power save modes to be utilized while data transfers or sessions via DLS are active. It is to be appreciated that that the DLS module 308, the TPSEC negotiator 310, power management module 312 and DPSD module 314 can be substantially similar to direct link set-up module 202, traffic specification negotiator 204, power management module 206, and DLS power save delivery module 208 as described with reference to FIG. 2. Further, mobile station 306 can include a direct link set-up (DLS) module 316, traffic specification (TPSEC) negotiator 318, power management module 320, and DLS power save delivery (DPSD) module 322 that are substantially similar to corresponding modules included in mobile station 304.

Pursuant to an illustration, mobile station 304 can retain data or frames that the mobile station 304 intends to transfer directly with mobile station 306. Direct data transfers can improve throughput and alleviate latency by obviating the requirement to route data through the access point 302. DLS module 308 of mobile station 304 can initiate direct link set-up protocol that is coordinated by the access point 302. The DLS module 308 can transmit a DLS Request to the access point 302. In an aspect, the DLS Request can include information such as, but not limited to, a rate set, capabilities of mobile station 304 and addresses (e.g., MAC addresses) of mobile stations 304 and 306. The access point 302 can forward the DLS Request to mobile station 306 to be managed by the DLS module 316 of mobile station 306. If the mobile station 306 accepts the direct stream, the DLS module 316 can transmit a DLS Response to the access point 302. The DLS Response can include information such as, but not limited to, a rate set, capabilities of mobile station 306, and addresses of mobile stations 304 and 306. The access point 302 can forward the DLS Response to mobile station 304 after which a direct link becomes active. DLS modules 308 and 316 can facilitate direct transmission of data frames via the direct link between mobile stations 304 and 306.

Typically, power management module 312 of mobile station 304 and power management module 320 of mobile station 306 can be prohibited from transitioning into a power save mode while active direct links persist. Power management modules 312 and 320 notify the access point 302 of power management states of mobile stations 304 and 306, respectively. However, mobile stations 304 and 306 remain unaware of such states associated with their respective direct link peers. DPSD modules 314 and 322 provide mechanisms to enable mobile stations 304 and 306, respectively, to maintain active direct links without prohibiting power management. Pursuant to an illustrative embodiment, DPSD modules 314 and 322 can employ scheduled delivery mechanisms and/or unscheduled delivery mechanisms. DPSD module 314 of mobile station 304 includes a scheduled DPSD module 324 that manages scheduled power save delivery and an unscheduled DPSD module 328 that manages unscheduled power save delivery. Similarly, DPSD module 322 of mobile station 306 includes a scheduled DPSD module 326 and an unscheduled DPSD module 330.

In a scheduled delivery mechanism, both mobile station 304 and mobile station 306 can enter a power save mode. In contrast, under an unscheduled delivery mechanism, one of mobile station 304 or 306 remains in an active mode while the other enters a power save mode. During establishment of a direct link, mobile stations 304 and 306 can determine whether to utilize a scheduled delivery mechanism, an unscheduled delivery mechanism or a combination thereof. For instance, if mobile station 304 engages in additional data traffic other than the direct link, an unscheduled mechanism can be employed to enable mobile station 306 to enter power save while mobile station 304 remains active to tend to other traffic. In addition, if both mobile stations 304 and 306 only maintain data traffic there between, a scheduled mechanism can be employed to enable both stations to enter power save.

Pursuant to an aspect, mobile stations 304 and 306 can maintain active direct links while also entering power save modes by sharing wake-up times or notifying each other upon waking. TPSEC negotiator 310 of mobile station 304 and TPSEC negotiator 318 of mobile station 306 can employ TPSEC negotiation to determine and/or setup scheduled or unscheduled wake-up times. In scheduled DPSD, the scheduled DPSD modules 324 and 326 are configured with a shared or scheduled wake up time. During TPSEC negotiation, an offset parameter and a service interval parameter can be established.

Figure 4:
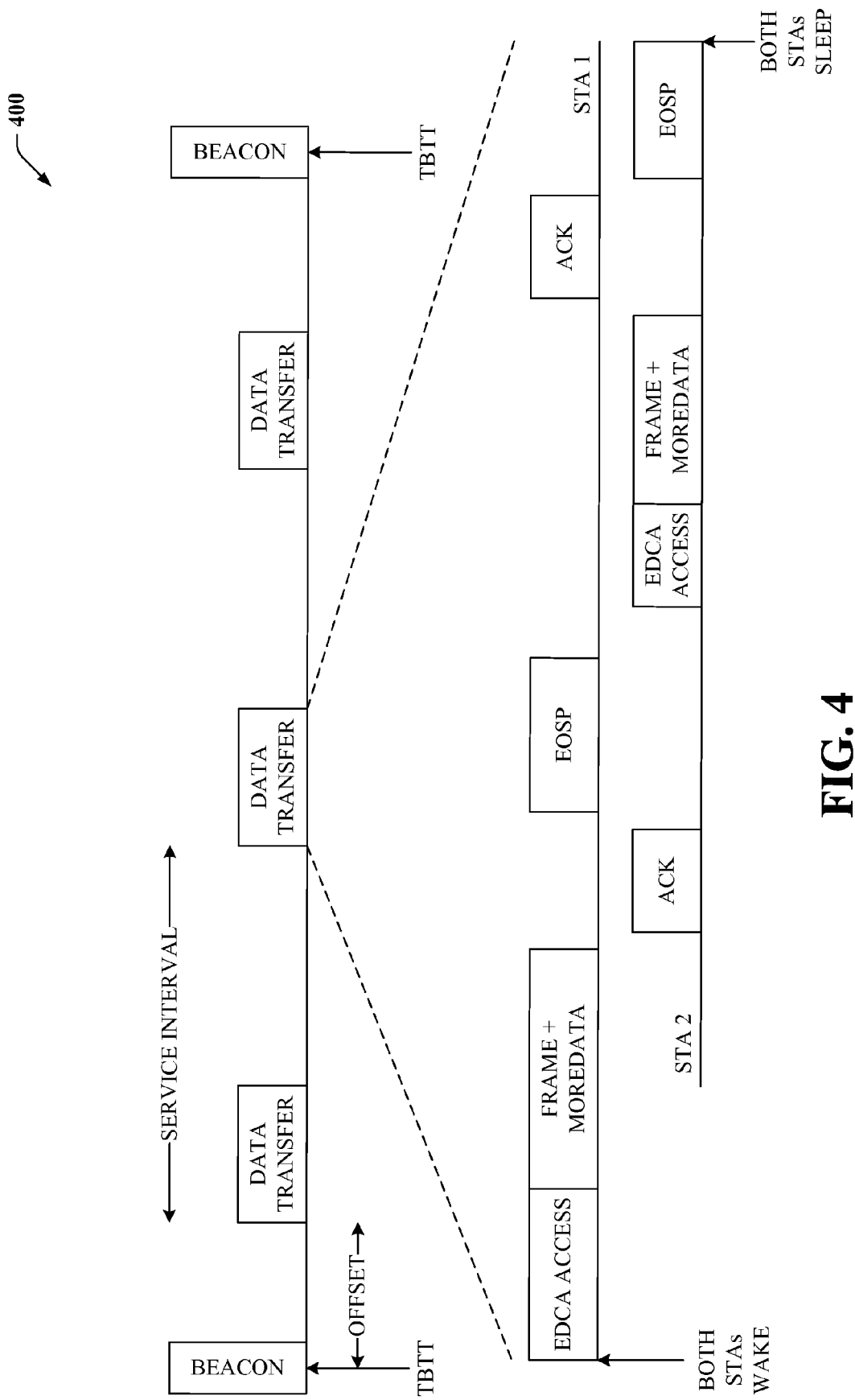
FIG. 4 is an illustration of an example timing diagram that depicts scheduled power save delivery according to an aspect of the subject disclosure.

Turning briefly to FIG. 4, illustrated is an example timing diagram 400 that depicts scheduled power save delivery according to an aspect of the subject disclosure. Pursuant to an illustration, mobile station 304 and mobile station 306 from FIG. 3 can interoperate in a manner consistent with timing diagram 400 in accordance with scheduled DPSD as provided by scheduled DPSD modules 324 and 326. Scheduled DPSD can be utilized with applications that employ QoS flows and/or best efforts flows. For example, scheduled DPSD can be utilized for VoIP data. As discussed supra, mobile stations can negotiate a shared wake-up time. The shared wake-up time can be established with reference to a particular time. For instance, the reference can be a target beacon transmission time (TBTT) which is a time at which an access point transmits a beacon utilized in power management.

As discussed supra, an offset parameter and a service interval parameter can be established during TPSEC negotiation to specify a shared time at which two mobile stations can wake up to transfer data. The offset parameter can indicate a time between the TBTT and a first data transfer interval. The service interval parameter can indicate a time between starting points of two consecutive data transfer windows. Accordingly, the offset parameter and the service interval parameter established the data transfer intervals or windows at which time mobile stations can wake up and transfer data over a direct link.

During a data transfer window, unidirectional or bidirectional data transfer can occur as depicted in diagram 400. At the beginning of a data transfer window, both mobile stations (e.g., STA1 and STA2) can enter an active mode (e.g., wake up) and perform enhanced distributed channel access (EDCA). EDCA is a contention based access mechanism that supports QoS flows. After EDCA, a mobile station (e.g., STA1) can transmit data (e.g., a frame). In addition, STA1 can employ a MoreData indicator that can notify a recipient (e.g., STA2) that additional buffered data exists. Upon successful receipt of the data frame, STA2 can transmit an acknowledgement (ACK). If STA1 has no more data, it can transmit an end of service period (EOSP) indicator that notifies STA2 that it is ready to return to a power save mode. As depicted in diagram 400, STA2 can perform substantially similar operations as STA1. When STA1 and STA1 both transmit and receive an EOSP indicator, the mobile stations return to a power save or sleep mode.

While diagram 400 depicts bidirectional data transfer, it is to be appreciated that unidirectional transfer can also be scheduled. At the agreed time, both stations wake-up. The transmitting station transmits frames as described supra. After transmission of data, the transmitting station sends an EOSP indication. Upon receiving an acknowledgment of the EOSP, the transmitting station enters a power save mode. If no acknowledgment is received, the transmitting station retransmits the EOSP indication and enters the power save mode. In addition, while the mobile stations are illustrated as transmitting data in turn, it is to be appreciated that the mobile stations can transmit simultaneously within the data transfer window.

Referring back to FIG. 3, mobile stations 304 and 306 can employ an unscheduled power save delivery mechanism in accordance with another aspect of the subject disclosure. In unscheduled DPSD, the unscheduled DPSD modules 328 and 330 are configured to notify a DLS peer upon waking and/or to transmit buffered data in response to a wake notification. For example, mobile station 304 can remain active while mobile station 306 enters a power save mode. The mobile station 306 can wake-up (e.g., enter an active mode) and transmit a notification to the mobile station 304. Upon receiving the notification, the mobile station 304 can transmit buffered data to mobile station 306.

Figure 5:
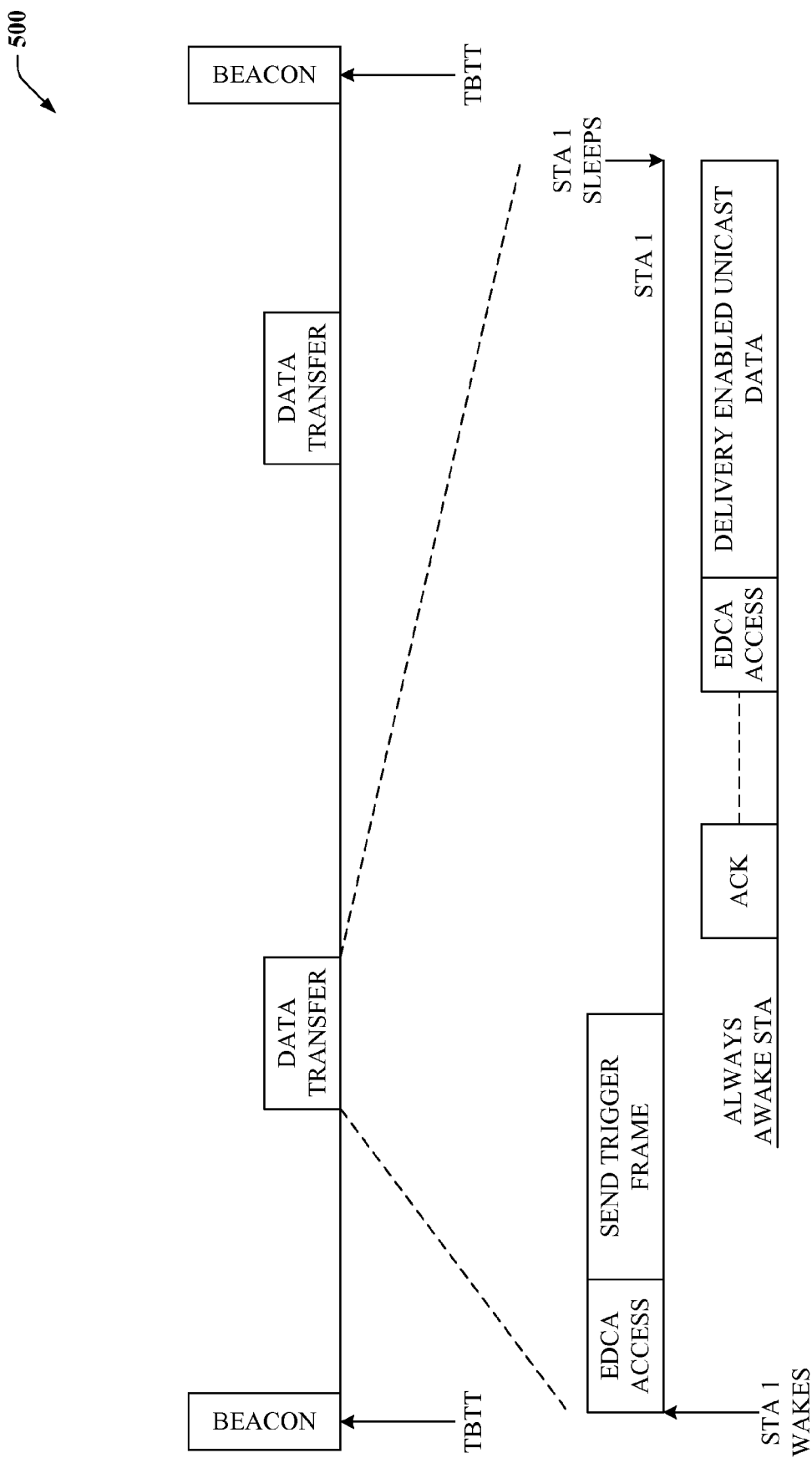
FIG. 5 is an illustration of an example timing diagram that depicts unscheduled power save delivery according to an aspect of the subject disclosure.

Turning now to FIG. 5, illustrated is an example timing diagram 500 that depicts unscheduled power save delivery according to an aspect of the subject disclosure. Pursuant to an illustration, mobile station 304 and mobile station 306 from FIG. 3 can interoperate in a manner consistent with timing diagram 500 in accordance with unscheduled DPSD as provided by unscheduled DPSD modules 328 and 330. During unscheduled DPSD, one station (e.g., an always awake STA) remains in an active mode while a peer station (e.g., STA1) is in a power save mode.

During a data transfer window, unidirectional transfer can occur as depicted in diagram 500. At the beginning of a data transfer window, STA1 can transition from a power save mode into active mode. STA1 performs EDCA access and transmits a trigger frame. The always awake STA can transmit an acknowledgment (ACK) in response to the trigger frame and commence transmitting buffered data to STA1 after performing EDCA access. Pursuant to an illustration, the buffered data can be data frames assigned to be delivery-enabled and can be limited by a configured maximum DLS service period parameter. It is to be appreciated that individual data frames can be transmitted in connection with a MoreData indicator as described supra with reference to FIG. 4. In addition, the always awake STA can employ an EOSP indication upon transmission of a last data frame. The EOSP indication can notify STA1 that it can return to a power save mode.

While diagram 400 depicts unidirectional data transfer, it is to be appreciated that bidirectional transfer can also be employed with unscheduled DPSD. For example, whenever a mobile station retains buffered data to transfer to a DLS peer station, it can transition out of power save mode into active mode and send a trigger frame. Upon receiving an acknowledgment, the mobile station can transmit data in a manner similar to that employed by the always awake station.

Referring to FIGS. 6-9, methodologies relating to maintaining active direct links during power save modes are described. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Figure 6:
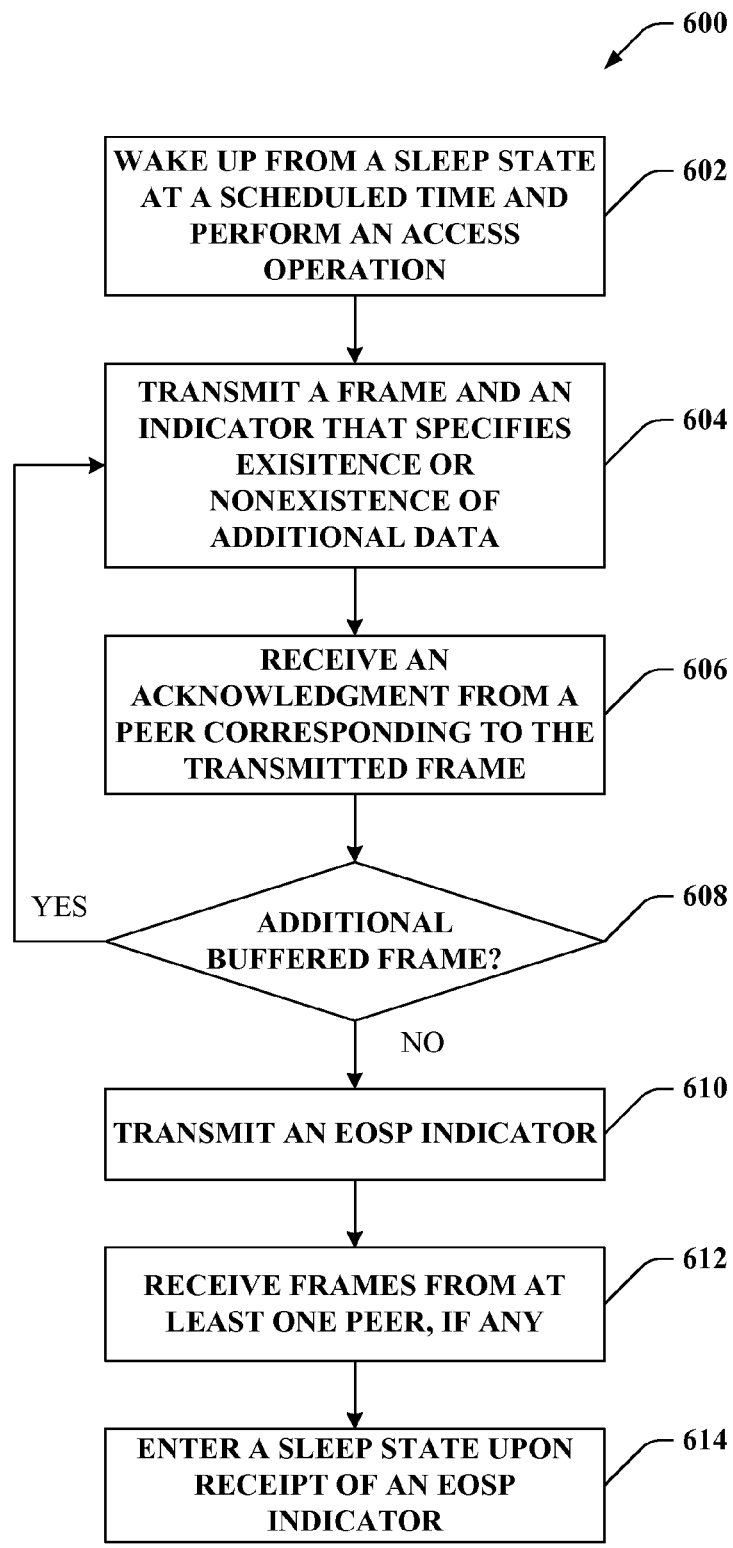
FIG. 6 is an illustration of an example methodology that facilitates employing a DLS power save delivery mechanism to transmit data.

Turning to FIG. 6, illustrated is a method 600 that facilitates employing a DLS power save delivery mechanism to transmit data in a wireless communications system. The method 600 can be implemented by a mobile station (e.g., mobile device, access terminal, user terminal, user equipment, etc.) to enable power management in connection with active direct links (e.g., DLS links), for example. The method 600 can commence at reference numeral 602 where an access operation is performed after waking up, at a scheduled time, from a sleep or power save state. Pursuant to an illustration, the scheduled time can be negotiated and specified in a traffic specification wherein the negotiation occurs between at least two mobile stations intent on establishing a direct data transfer link. In one aspect, the scheduled time can be an offset from a reference time such as a target beacon transmission time (TBTT).

At reference numeral 604, a data frame and an indicator can be transmitted to a DLS peer (e.g., another mobile station privy to the direct link). The indicator can specify existence or non-existence of additional data. At reference numeral 606, an acknowledgment corresponding to the transmitted data frame can be received from the DLS peer. At reference numeral 608, a determination is made as to whether additional data frames are buffered. For instance, if the transmitted indicator specified additional data was present, then the additional data can be determined to be buffered and the method 600 returns to reference numeral 604 to transmit at least one additional data frame and another indicator. If no additional data is buffered, the method 600 proceeds to reference numeral 610 where an end of service period (EOSP) indicator is transmitted. The EOSP indicator notifies the DLS peer that no additional data is buffered and that the transmitting station is ready to enter a power save mode. At reference numeral 612, data frames, if any, are received from at least one peer. It is to be appreciated that reference numeral 612 can occur simultaneously and/or concurrently with reference numerals 602-610. At reference numeral 614, a power save or sleep mode is entered upon receipt of an EOSP indicator from a DLS peer.

Figure 7:
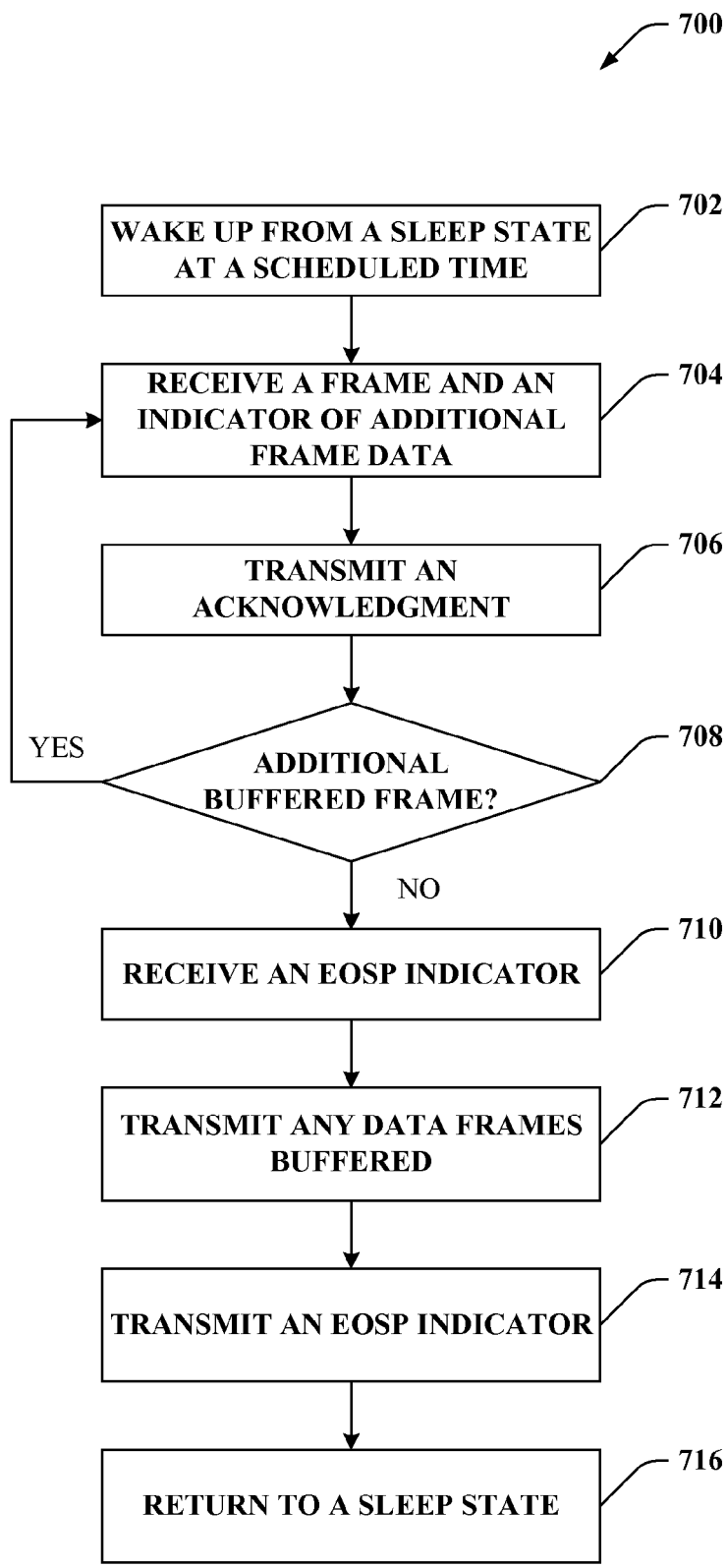
FIG. 7 is an illustration of an example methodology that facilitates receiving data transmission in accordance with a DLS power save delivery mechanism.

Referring to FIG. 7, illustrated is a methodology 700 that facilitates receiving data transmission in accordance with a DLS power save delivery mechanism. The method 700 can be implemented by a mobile station (e.g., mobile device, access terminal, user terminal, user equipment, etc.) to enable power management states in connection with active direct links (e.g., DLS links), for example. The method 700 can commence at reference numeral 702 where an active state is entered from a sleep state at a scheduled time. The scheduled time can be negotiated and specified in a traffic specification wherein the negotiation occurs between at least two mobile stations intent on establishing a direct data transfer link. For instance, the scheduled time can be an offset from a reference time such as a target beacon transmission time (TBTT).

At reference numeral 704, a data frame and an indicator is received wherein the indicator informs of additional frame data (or informs no additional data exists). At reference numeral 706, an acknowledgment is transmitted in response to the received data frame. At reference numeral 708, a determination is made as to whether additional buffered data is waiting for transmission. For instance, the indicator received at reference numeral 704 can indicate additional buffered data is available. In addition, the indicator can specify that no additional buffered data is available. If additional buffered data is waiting, the method 700 returns to reference numeral 704 where an additional data frame and indicator is received. The method 700 can continue to loop until and indication of no additional data is received. If no more data is waiting, the method 700 proceeds to reference numeral 710 where an end of service period (EOSP) indication is received. At reference numeral 712, any buffered data frames for a DLS peer can be transmitted. For example, the data can be transmitted in accordance with method 600 described with reference to FIG. 6. In addition, it is to be appreciated that reference numeral 712 can occur simultaneously and/or concurrently with reference numerals 702-710. At reference numeral 714, an EOSP indication is transmitted to the DLS peer. At reference numeral 716, a power save or sleep mode is entered.

Figure 8:
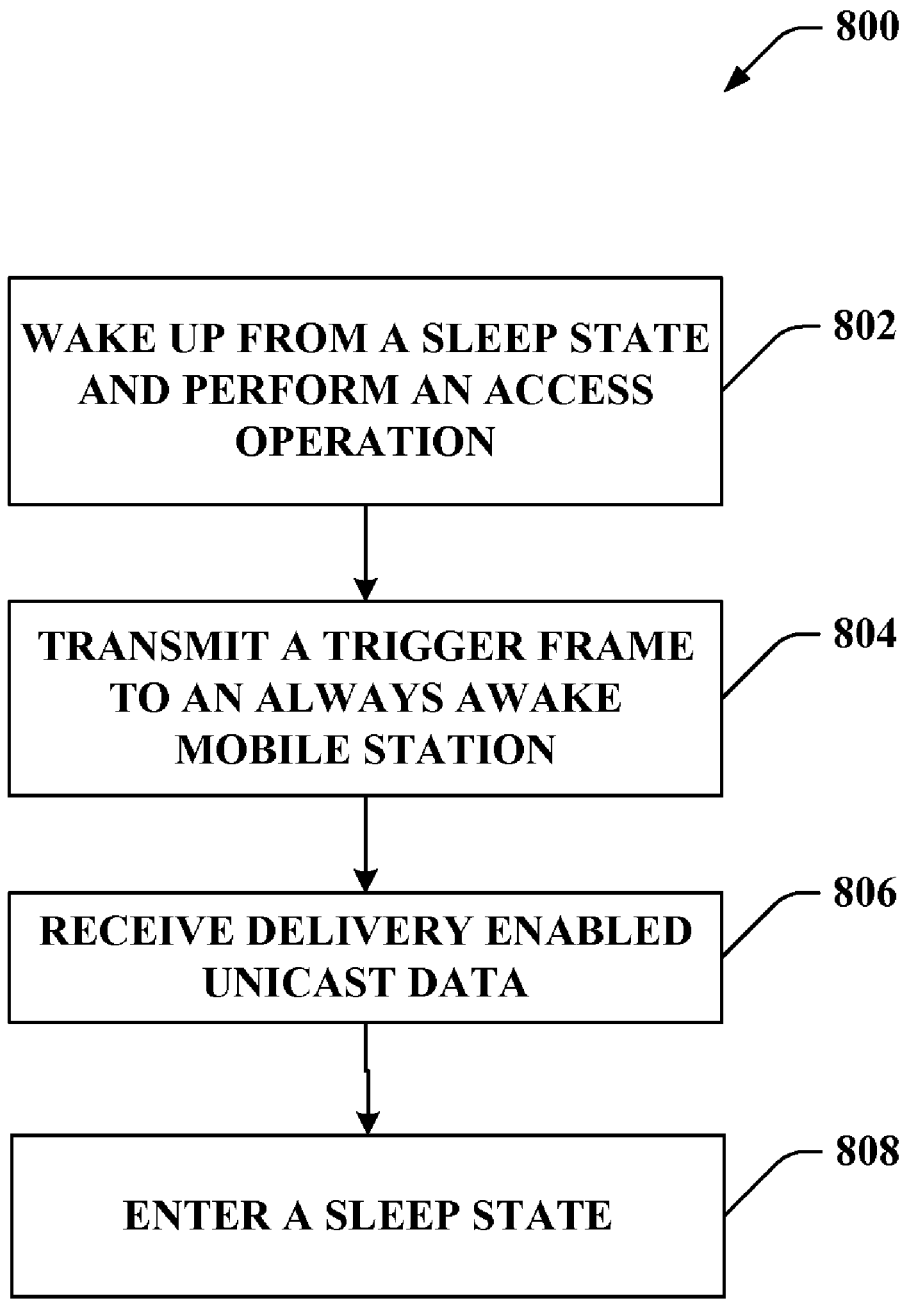
FIG. 8 is an illustration of an example methodology that facilitates receiving data transmissions according to an unscheduled DLS power save delivery mechanism.

FIG. 8 illustrates a method 800 that facilitates receiving data transmissions according to an unscheduled DLS power save delivery mechanism. The method 800 can be implemented by a mobile station that enters a power save mode while maintaining an active direct link with an always awake station. The method 800 can commence at reference numeral 802 where the mobile station wakes from a sleep state (e.g., power save mode) and performs an access operation. At reference numeral 804, a trigger frame is transmitted to an always awake mobile station. At reference numeral 806, delivery enabled unicast data is received. At reference numeral 808, the mobile station returns to a sleep state or power save mode.

Figure 9:
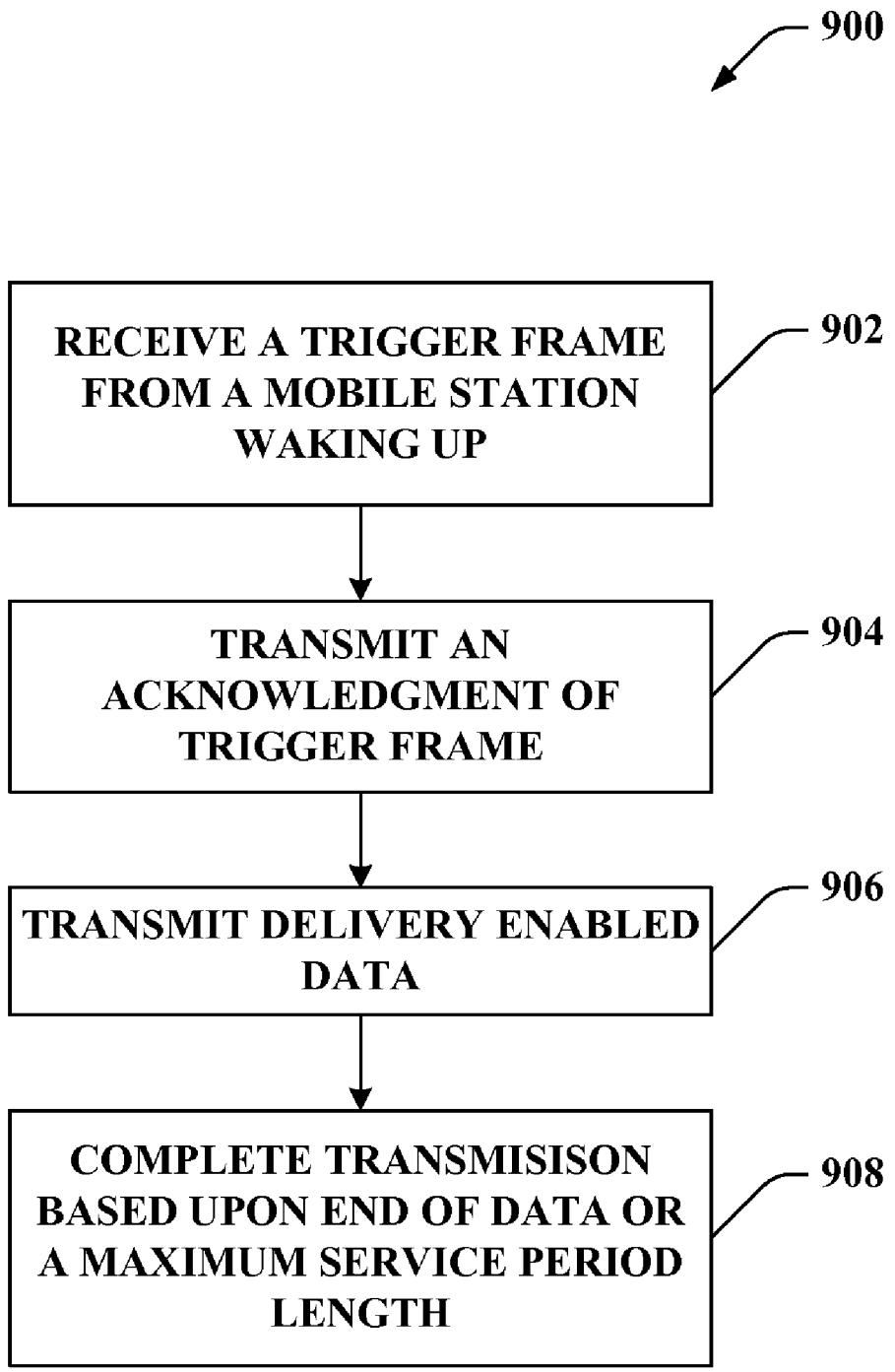
FIG. 9 is an illustration of an example methodology that facilitates employing an unscheduled DLS power save delivery mechanism to transmit data.

FIG. 9 depicts a method 900 that facilitates employing an unscheduled DLS power save delivery mechanism to transmit data. The method 900 can be employed by an always awake mobile station that retains buffered data frames for a peer mobile station in a power save mode. The method 900 can commence at reference numeral 902 where a trigger frame is received from a peer mobile station transitioning from a power save state. At reference numeral 904, an acknowledgment is transmitted in response to the trigger frame. At reference numeral 906, delivery enabled data is transmitted to the peer mobile station. At reference numeral 908, the transmission of the delivery enabled data is completed based upon at least one of an end of buffer or a maximum service period length.

It will be appreciated that, in accordance with one or more aspects described herein, inferences can be made regarding establishing DLS power save delivery parameters, negotiating traffic specifications, determining a delivery power save mode to employ and the like. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic— that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 10:
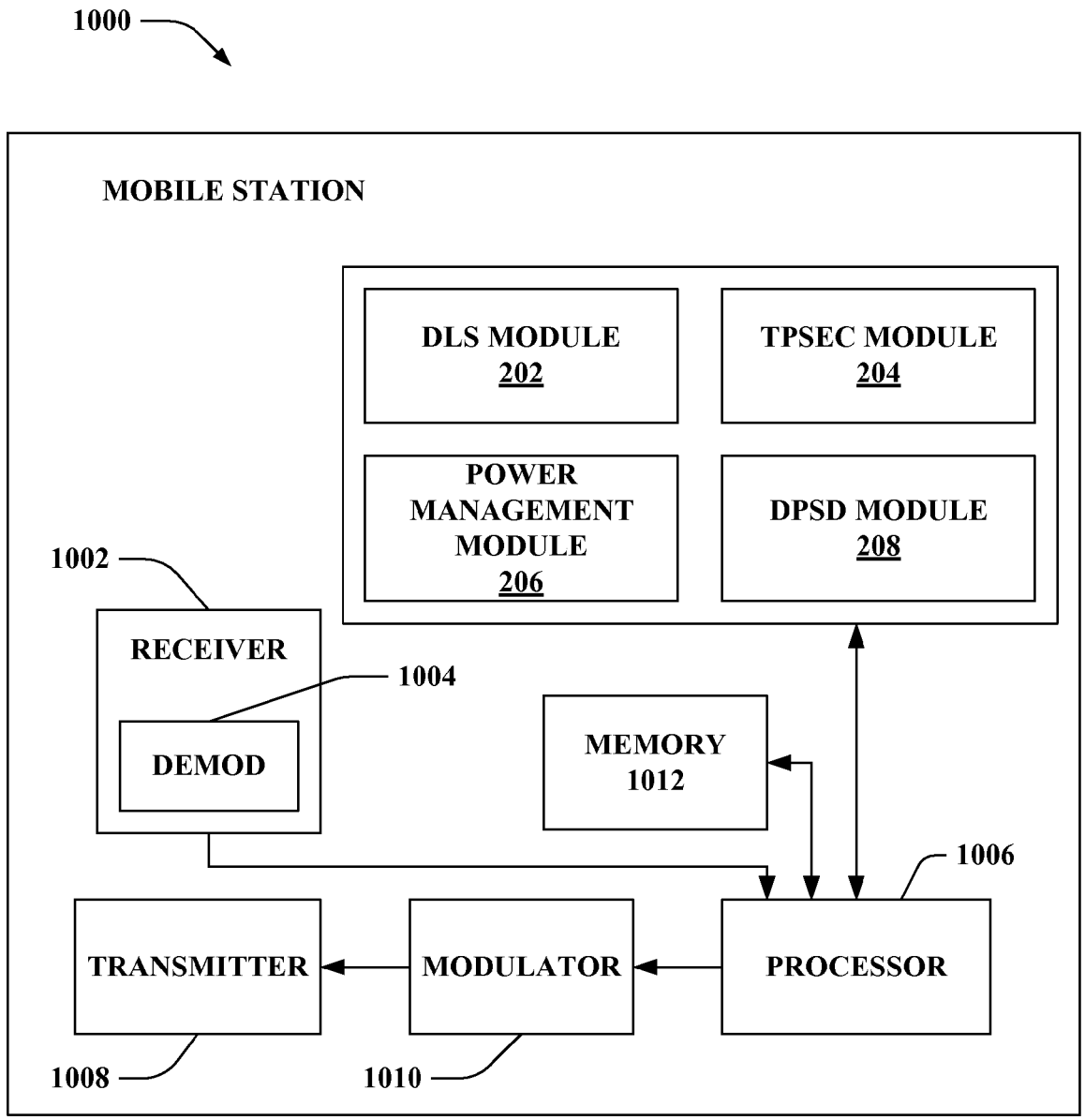
FIG. 10 is an illustration of an example system that facilitates utilizing DLS power save delivery mechanisms.

FIG. 10 is an illustration of a mobile station 1000 that can facilitate communications associated with a mobile station in a wireless communication system in accordance with an aspect of the disclosed subject matter. It is to be appreciated that the mobile station 1000 can be the same or similar as, and/or can comprise the same or similar functionality as, mobile station 104, mobile station 106, mobile station 304, mobile station 306 or communications apparatus 200, such as more described herein, for example, with regard to system 100, system 300, methodology 600, methodology 700, methodology 800, and methodology 900.

Mobile station 1000 can comprise a receiver 1002 that receives a signal from, for instance, a receive antenna (not shown), and performs typical actions thereon (e.g., filters, amplifies, downconverts, etc.) the received signal and digitizes the conditioned signal to obtain samples. Receiver 1002 can be, for example, an MMSE receiver, and can comprise a demodulator 1004 that can demodulate received symbols and provide them to a processor 1006. Processor 1006 can be a processor dedicated to analyzing information received by receiver 1002 and/or generating information for transmission by a transmitter 1008, a processor that controls one or more components of mobile station 1000, and/or a processor that both analyzes information received by receiver 1002, generates information for transmission by transmitter 1008, and controls one or more components of mobile station 1000. Mobile station 1000 can also comprise a modulator 1010 that can work in conjunction with the transmitter 1008 to facilitate transmitting signals (e.g., data) to, for instance, an access point (e.g., 102, 302), another mobile station (e.g., 104, 106, 304, 306), etc.

In one aspect, the processor 1006 can be connected to a DLS module 202 that facilitates establishment of direct links between mobile station 1000 and any other non-access point mobile station. The DLS module 202 can set-up or establish a direct link before a data session commences. In addition, the DLS module 202 can maintain the direct link during the data session and, further, tear-down or destroy the direct link upon completion of the data session. In another aspect, the processor 1006 can be connected to a TPSEC module 204 that facilitates negotiating and generating traffic specifications (TPSECs) for the mobile station 1000. The processor 1006 also can be connected to power management module 206 facilitates power management and/or conservation. The power management module 206 can configure the power management mode of the mobile station 1000. For instance, the power management module 206 can change the state or mode of the mobile station 1000 from an awake or active mode to a sleep or power save mode. In addition, the power management mode 206 can transition the mobile station 1000 from a sleep mode to an active mode. The processor 1006 also can be connected to a DPSD module 208 that facilitates direct data transfers between the mobile station 1000 and other mobile station peers while enabling employment of power save mode.

Mobile device 1000 can additionally comprise memory 1012 that is operatively coupled to processor 1006 and that can store data to be transmitted, received data, information related to available channels, data associated with analyzed signal and/or interference strength, information related to an assigned channel, power, rate, or the like, and any other suitable information for estimating a channel and communicating via the channel. Memory 1012 can additionally store protocols and/or algorithms associated with estimating and/or utilizing a channel (e.g., performance based, capacity based, etc.). Further, memory 1012 can retain prioritized bit rates, maximum bit rates, queue sizes, etc., related to one or more bearers serviced by the mobile device 1000.

It will be appreciated that the data store (e.g., memory 1012) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1012 of the subject systems and methods is intended to comprise, without being limited to, these and any other suitable types of memory.

It is to be appreciated and understood that the DLS module 202, TPSEC module 204, power management module 206, DPSD module 208, and memory 1012 each can be the same or similar as, or can comprise the same or similar functionality as, respective components such as more fully described herein, for example, with regard to system 100, apparatus 200, system 300, diagram 400, and diagram 500. It is to be further appreciated and understood that the DLS module 202, TPSEC module 204, power management module 206, DPSD module 208, and memory 1012 each can be a stand-alone unit (as depicted), can be included within the processor 1006, can be incorporated within another component, and/or virtually any suitable combination thereof, as desired.

Figure 11:
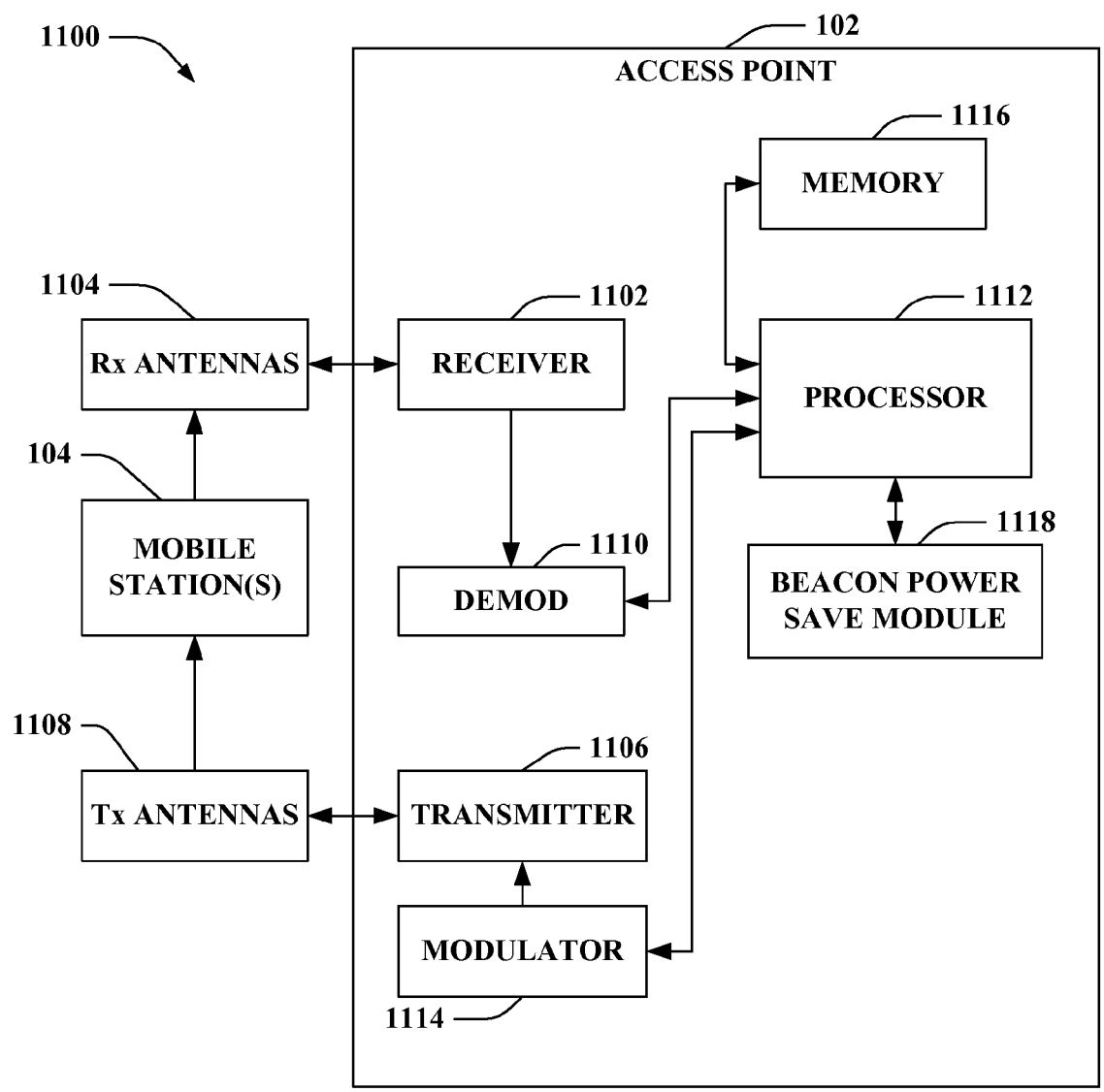
FIG. 11 is an illustration of an example system that facilitates direct link set-up delivery in accordance with an aspect of the subject disclosure.

FIG. 11 is an illustration of a system 1100 that can facilitate communications associated with a mobile device in a wireless communication system in accordance with an aspect of the disclosed subject matter. System 1100 can comprise an access point 102. The access point 102 can include a receiver 1102 that can receive signal(s) from one or more mobile stations 104 through a plurality of receive antennas 1104, and a transmitter 1106 that can transmit signals (e.g., data) to the one or more mobile devices 116 through a transmit antenna 1108. Receiver 1102 can receive information from receive antennas 1104 and can be operatively associated with a demodulator 1110 that can demodulate received information. Demodulated symbols can be analyzed by a processor 1112 that can be a processor dedicated to analyzing information received by receiver 1102 and/or generating information for transmission by a transmitter 1106, a processor that controls one or more components of access point 102, and/or a processor that both analyzes information received by receiver 1102, generates information for transmission by transmitter 1106, and controls one or more components of access point 102. The access point 102 can also comprise a modulator 1114 that can work in conjunction with the transmitter 1106 to facilitate transmitting signals (e.g., data) to, for instance, a mobile station 104, another device, etc.

Processor 1112 can be connected with a beacon power save module 1118 that can enable power management of mobile stations 104. For example, the access point 102 can receive notifications that one or more mobile stations 104 are entering a power save mode. At configured target beacon transmission times (TBTTs), the beacon power save module 1118 can transmit a beacon that includes a traffic indicator map to inform mobile stations 104 in power save mode of buffered traffic.

Access point 102 can additionally comprise memory 1116 that is operatively coupled to processor 1112 and that can store data to be transmitted, received data, information related to available channels, data associated with analyzed signal and/or interference strength, information related to an assigned channel, power, rate, or the like, and any other suitable information for estimating a channel and communicating via the channel. Memory 1116 can additionally store protocols and/or algorithms associated with estimating and/or utilizing a channel (e.g., performance based, capacity based, etc.).

It will be appreciated that the memory 1116 described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1116 of the subject systems and methods is intended to comprise, without being limited to, these and any other suitable types of memory. It is to be further appreciated and understood that the beacon power save module 1118 and memory 1116 each can be a stand-alone unit (as depicted), can be included within the processor 1112, can be incorporated within another component, and/or virtually any suitable combination thereof, as desired.

Figure 12:
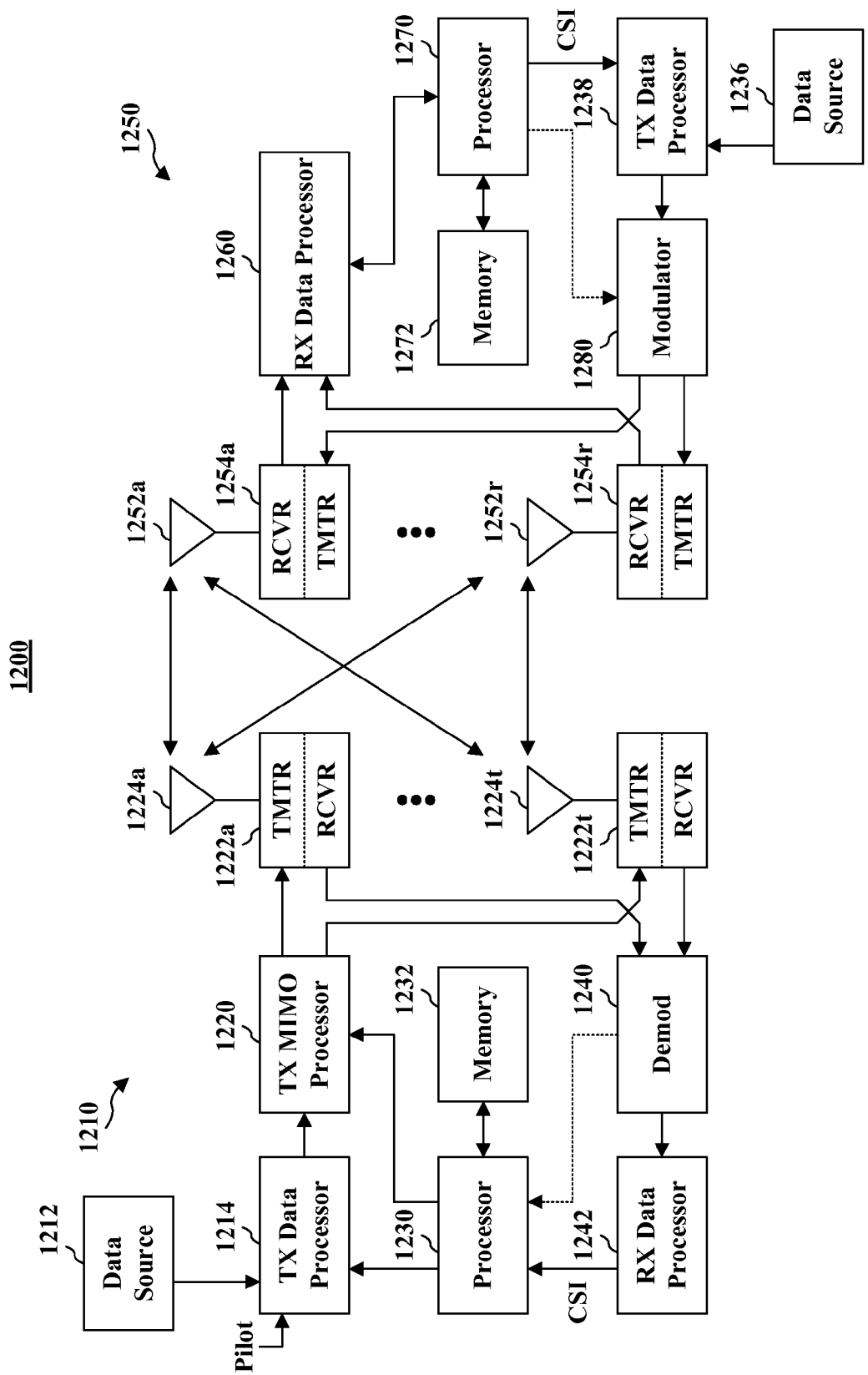
FIG. 12 is an illustration of an example wireless network environment that can be employed in conjunction with the various systems and methods described herein.

FIG. 12 shows an example wireless communication system 1200. The wireless communication system 1200 depicts one access point 1210 and one mobile station 1250 for sake of brevity. However, it is to be appreciated that system 1200 can include more than one access point and/or more than one mobile station, wherein additional access points and/or mobile stations can be substantially similar or different from example access point 1210 and mobile station 1250 described below. In addition, it is to be appreciated that access point 1210 and/or mobile station 1250 can employ the systems (FIGS. 1-3 and 10-11), timing diagrams (FIGS. 4-5) and/or methods (FIGS. 6-9) described herein to facilitate wireless communication there between.

At access point 1210, traffic data for a number of data streams is provided from a data source 1212 to a transmit (TX) data processor 1214. According to an example, each data stream can be transmitted over a respective antenna. TX data processor 1214 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile station 1250 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1230.

The modulation symbols for the data streams can be provided to a TX MIMO processor 1220, which can further process the modulation symbols (e.g., for OFDM). TX MIMO processor 1220 then provides $N_T$ modulation symbol streams to $N_T$ transmitters (TMTR) 1222a through 1222t. In various embodiments, TX MIMO processor 1220 applies beamforming weights to the symbols of the data streams and to the antenna from which the symbol is being transmitted.

Each transmitter 1222 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1222a through 1222t are transmitted from $N_T$ antennas 1224a through 1224t, respectively.

At mobile station 1250, the transmitted modulated signals are received by $N_R$ antennas 1252a through 1252r and the received signal from each antenna 1252 is provided to a respective receiver (RCVR) 1254a through 1254r. Each receiver 1254 conditions (e.g., filters, amplifies, and downconverts) a respective signal, digitizes the conditioned signal to provide samples, and further processes the samples to provide a corresponding "received" symbol stream.

An RX data processor 1260 can receive and process the $N_R$ received symbol streams from $N_R$ receivers 1254 based on a particular receiver processing technique to provide $N_T$ "detected" symbol streams. RX data processor 1260 can demodulate, deinterleave, and decode each detected symbol stream to recover the traffic data for the data stream. The processing by RX data processor 1260 is complementary to that performed by TX MIMO processor 1220 and TX data processor 1214 at access point 1210.

A processor 1270 can periodically determine which preceding matrix to utilize as discussed above. Further, processor 1270 can formulate a reverse link message comprising a matrix index portion and a rank value portion.

The reverse link message can comprise various types of information regarding the communication link and/or the received data stream. The reverse link message can be processed by a TX data processor 1238, which also receives traffic data for a number of data streams from a data source 1236, modulated by a modulator 1280, conditioned by transmitters 1254a through 1254r, and transmitted back to access point 1210.

At access point 1210, the modulated signals from mobile station 1250 are received by antennas 1224, conditioned by receivers 1222, demodulated by a demodulator 1240, and processed by a RX data processor 1242 to extract the reverse link message transmitted by mobile station 1250. Further, processor 1230 can process the extracted message to determine which preceding matrix to use for determining the beamforming weights.

Processors 1230 and 1270 can direct (e.g., control, coordinate, manage, etc.) operation at access point 1210 and mobile station 1250, respectively. Respective processors 1230 and 1270 can be associated with memory 1232 and 1272 that store program codes and data. Processors 1230 and 1270 can also perform computations to derive frequency and impulse response estimates for the uplink and downlink, respectively.

Access point 1210 and mobile station 1250 may support 802.11 standards, such as 802.11b, 802.11e, 802.11g, 802.11n, etc. 802.11g is backward compatible with 802.11b and supports all of the operating modes defined by 802.11b. Access point 1210 and mobile station 1250 may further support a range extension mode, which supports at least one data rate that is lower than the lowest data rate in 802.11b/g. The lower data rate(s) may be used to extend coverage range, which is beneficial for certain applications such as walkie-talkie. For instance, access point 1210 and mobile station 1250 can support standard 802.11b/g/n data rates ranging from 1 to 600 Mbps and proprietary extension rate ranging from 0.25 to 1.0 Mbps.

For clarity, in the following description, the term "bit" refers to a quantity prior to modulation (or symbol mapping) at the transmitting station, the term "symbol" refers to a quantity after the symbol mapping, and the term "chip" refers to a quantity after spectral spreading. The term "sample" refers to a quantity prior to spectral despreading at the receiving station.

For IEEE 802.11, data is processed by a medium access control (MAC) layer as MAC protocol data units (MPDUs). Each MPDU is processed by a physical layer convergence protocol (PLCP) and encapsulated in a PLCP protocol data unit (PPDU). Each PPDU is processed by a physical layer (as shown in FIG. 2) and transmitted via a wireless channel.

Figure 13:
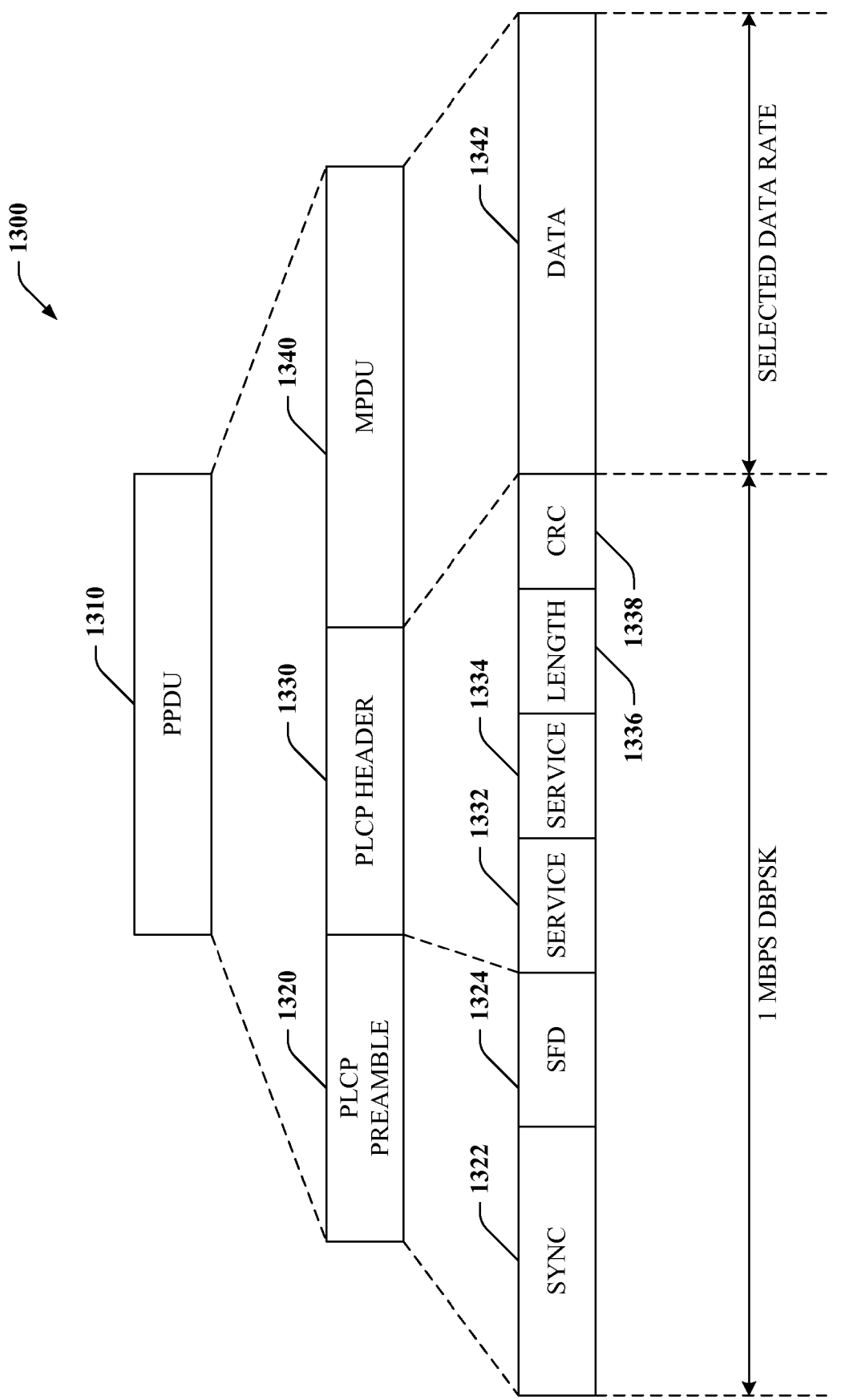
FIG. 13 is an illustration of an example protocol data unit in accordance with an aspect of the subject disclosure.

FIG. 13 shows am example PPDU structure 1300 used by 802.11b/g/n. For PPDU structure 1300, a PPDU 1310 includes a PLCP preamble 1320, a PLCP header1 330, and an MPDU 1340. MPDU 1340 carries traffic data for PPDU 1310 and has a variable length. PLCP preamble 1320 includes a PLCP synchronization (SYNC) field 1322 and a start frame delimiter (SFD) field 1324. SYNC field 1322 carries a fixed 128-bit sequence that may be used by a receiving station for signal detection, acquisition, and other purposes. The bits in the 128-bit sequence are denoted as $d_0, d_1, \ldots, d_{127}$. SFD field 1324 carries a fixed 16-bit sequence that indicates the start of the PLCP header. PLCP header 1330 includes a SIGNAL field 1332 that indicates the data rate for the MPDU, a SERVICE field 1334 that is set to '0' to signify compliance with IEEE 802.11, a LENGTH field 1336 that indicates the amount of time (in units of microseconds) required to send MPDU 1340, and a CRC field 1338 that carries a CRC value generated based on the SIGNAL, SERVICE, and LENGTH fields. PLCP preamble 1320 and PLCP header 1330 are sent at 1 Mbps using DBPSK. PLCP preamble 1320 contains a total of 144 bits, which are processed to generate 144 BPSK symbols. Each BPSK symbol is composed of 11 output chips, which are obtained by spreading that BPSK symbol with the 11 chips of the Barker sequence. The 144 BPSK symbols are transmitted in 144 symbol periods, with each symbol period having a duration of 1 microsecond (μs).

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 14:
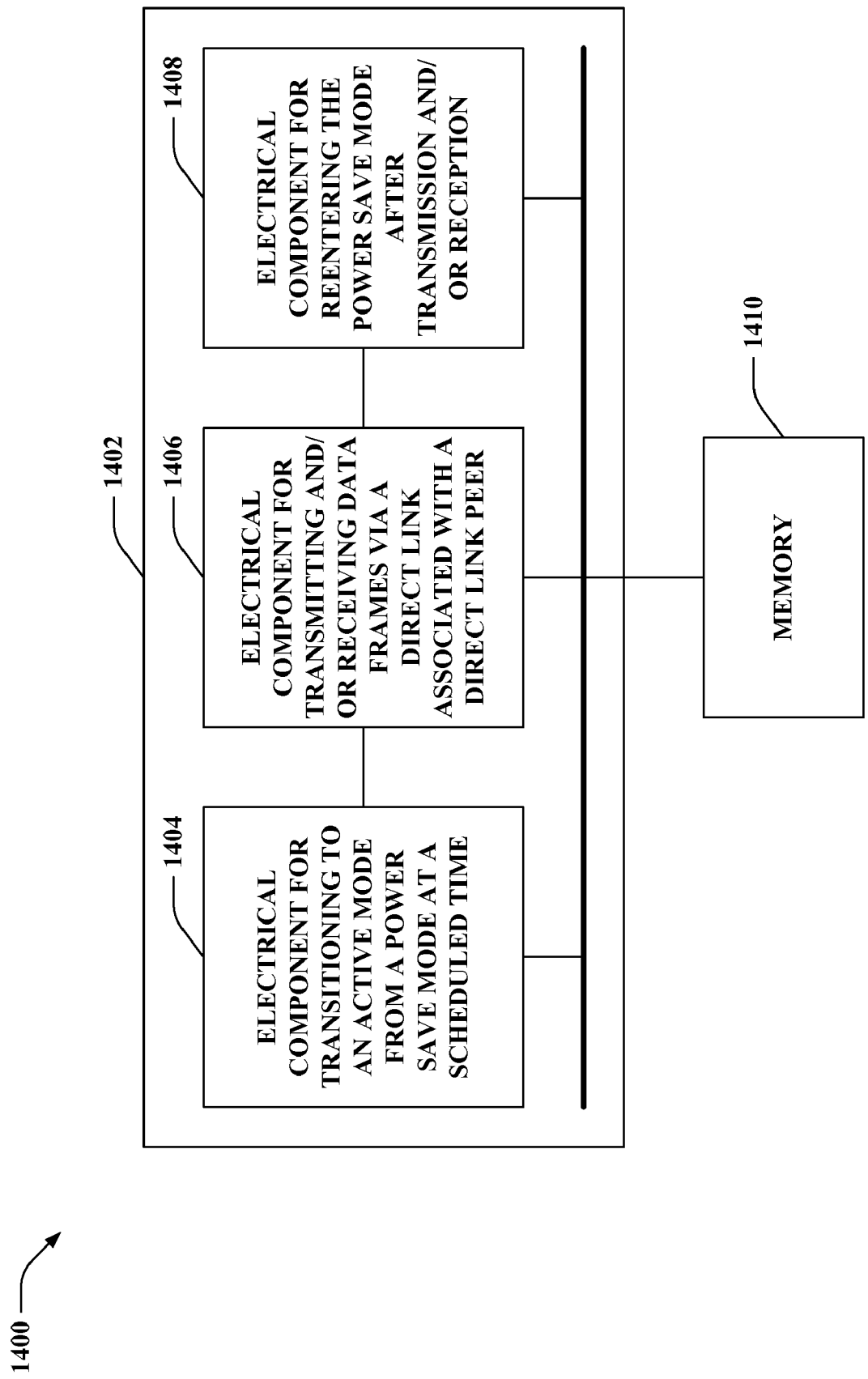
FIG. 14 is an illustration of an example system that facilitates maintaining direct link data transfers during management of power modes.

With reference to FIG. 14, illustrated is a system 1400 that facilitates maintaining direct link data transfers during management of power modes. For example, system 1400 can reside at least partially within a mobile station. It is to be appreciated that system 1400 is represented as including functional blocks, which can be functional blocks that represent functions implemented by a processor, software, or combination thereof (e.g., firmware). System 1400 includes a logical grouping 1402 of electrical components that can act in conjunction. For instance, logical grouping 1402 can include an electrical component for transitioning to an active mode from a power save mode at a scheduled time 1404. Further, logical grouping 1402 can comprise an electrical component for transmitting and/or receiving data frames via a direct link associated with a direct link peer 1406. Moreover, logical grouping 1402 can comprise an electrical component for reentering the power save mode after transmission and/or reception 1408. Additionally, system 1400 can include a memory 1410 that retains instructions for executing functions associated with electrical components 1404, 1406, and 1408. While shown as being external to memory 1410, it is to be understood that one or more of electrical components 1404, 1406, and 1408 can exist within memory 1410.

Figure 15:
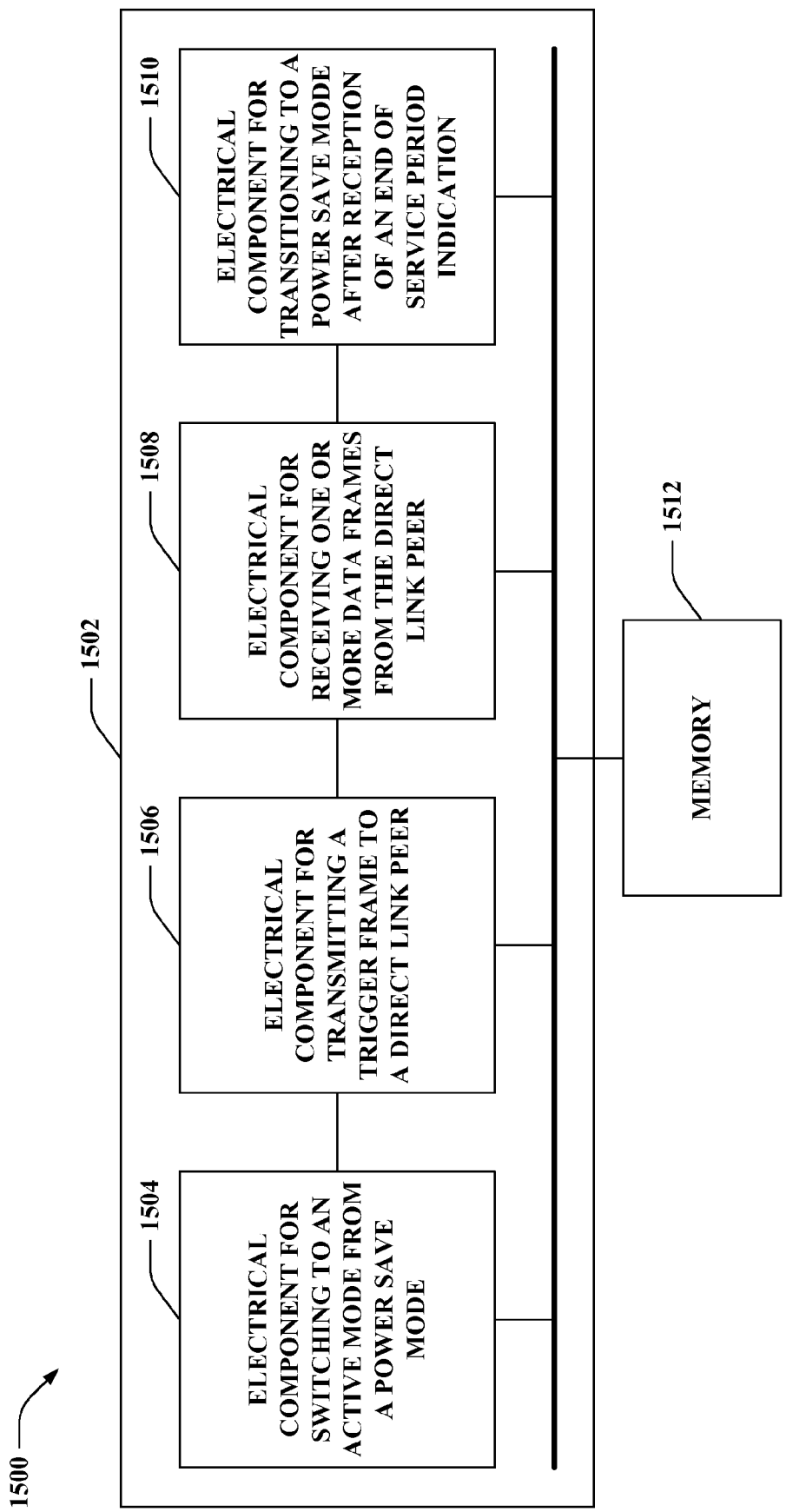
FIG. 15 is an illustration of an example system that enables power save modes during active direct transfers.

Turning now to FIG. 15, illustrated is a system 1500 that enables power save modes during active direct transfers. For example, system 1500 can reside at least partially within a base station, mobile device, etc. It is to be appreciated that system 1500 is represented as including functional blocks, which can be functional blocks that represent functions implemented by a processor, software, or combination thereof (e.g., firmware). System 1500 includes a logical grouping 1502 of electrical components that can act in conjunction. For instance, logical grouping 1502 can include an electrical component for switching to an active mode from a power save mode 1504. Further, logical grouping 1502 can comprise an electrical component for transmitting a trigger frame to a direct link peer 1506. Moreover, logical grouping 1502 can comprise an electrical component for receiving one or more data frames from the direct link peer 1508. Further, logical grouping 1502 can include an electrical component for transitioning to a power save mode after reception of an end of service period indication 1510. Additionally, system 1500 can include a memory 1512 that retains instructions for executing functions associated with electrical components 1504, 1506, 1508 and 1510. While shown as being external to memory 1512, it is to be understood that one or more of electrical components 1504, 1506, 1508 and 1510 can exist within memory 1512.

Figure 16:
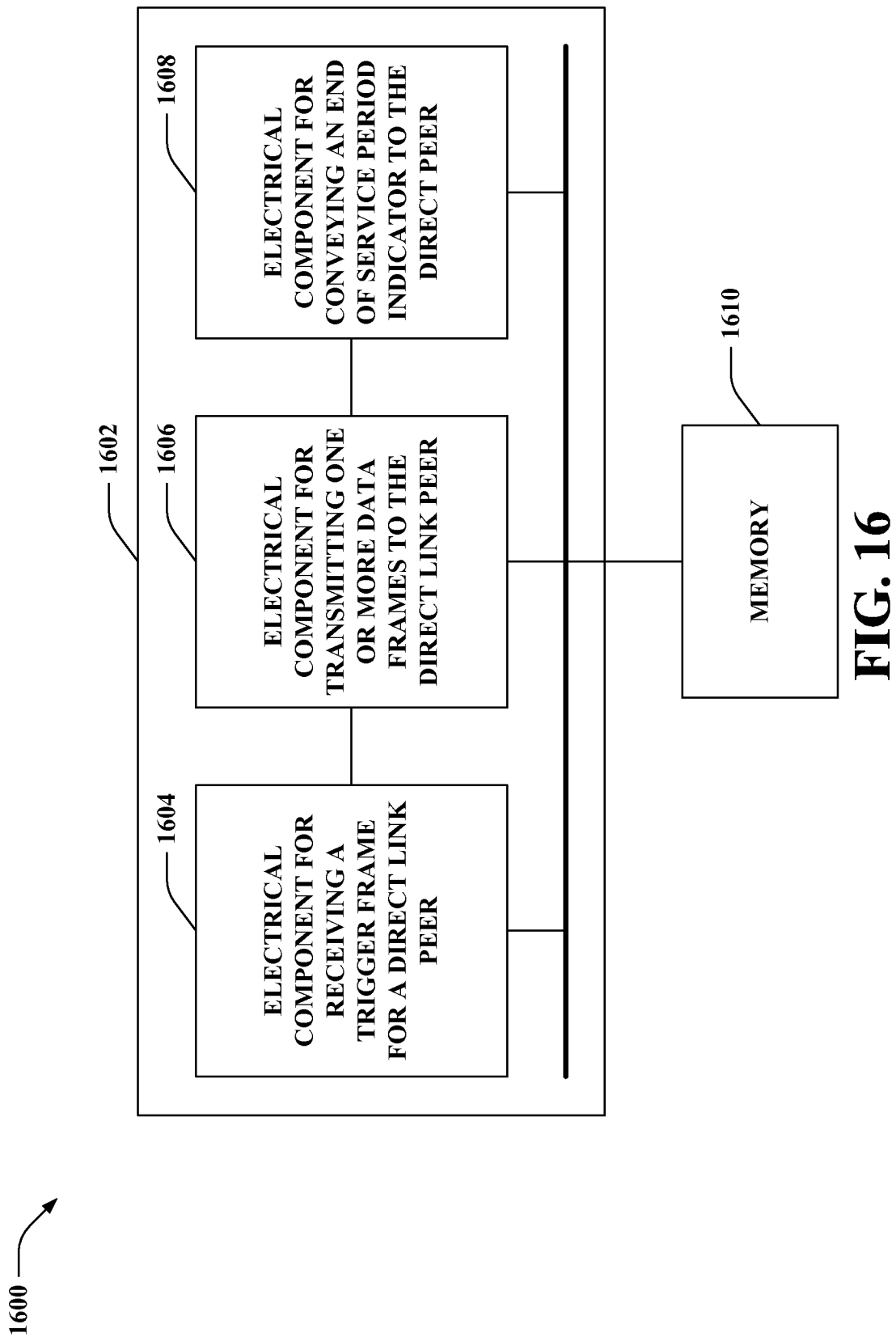
FIG. 16 is an illustration of an example system that enables power save modes during active direct transfers.

With reference to FIG. 16, illustrated is a system 1600 that enables power save modes during active direct transfers in wireless communications. For example, system 1600 can reside at least partially within a base station, mobile device, etc. It is to be appreciated that system 1600 is represented as including functional blocks, which can be functional blocks that represent functions implemented by a processor, software, or combination thereof (e.g., firmware). System 1600 includes a logical grouping 1602 of electrical components that can act in conjunction. For instance, logical grouping 1602 can include an electrical component for receiving a trigger frame for a direct link peer 1604. Further, logical grouping 1602 can comprise an electrical component for transmitting one or more data frames to the direct link peer 1606. Moreover, logical grouping 1602 can comprise an electrical component for conveying an end of service period indicator to the direct peer 1608. Additionally, system 1600 can include a memory 1610 that retains instructions for executing functions associated with electrical components 1604, 1606, and 1608. While shown as being external to memory 1610, it is to be understood that one or more of electrical components 1604, 1606, and 1608 can exist within memory 1610.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates power save direct data transfers in a wireless communication system, comprising:

transitioning to an active mode from a power save mode at a scheduled time after a target beacon transmission time;

performing at least one of a transmission of one or more data frames to a direct link peer or a reception of one or more data frames from a direct link peer;

transmitting an end of service period indication upon completion of a data transmission;

receiving an end of service period indication; and reentering the power save mode.

2. The method of claim 1, wherein a first of the transmission of one or more data frames is performed after an offset time relative to the target beacon transmission time.

3. The method of claim 1, further comprising negotiating the scheduled time with the direct link peer via a traffic specification negotiation.

4. The method of claim 3, wherein negotiating the scheduled time includes establishing an offset parameter and a service interval parameter, wherein the offset parameter indicates a time between the target beacon transmission time and a first data transfer window and wherein the service interval parameter indicates a time between starting points of two consecutive data transfer windows.

5. The method of claim 1, further comprising transmitting a more data indication with each data frame transmitted between reception times of two consecutive beacons, the more data indication indicating at least one of an end of data or an existence of additional data.

6. The method of claim 1, wherein reentering the power save mode comprises entering the power save mode upon both transmission of a first end of service indication to the direct link peer and reception of a second end of service indication from the direct link peer.

7. The method of claim 1, further comprising receiving an acknowledgment in response to the transmission of one or more data frames to a direct link peer.

8. The method of claim 1, further comprising sending an acknowledgment in response to receiving the end of service period indication.

9. The method of claim 1, further comprising receiving a beacon after receiving the end of service period indication.

10. A wireless communications apparatus that facilitates scheduling direct transfers to enable power save, comprising:
    means for transitioning to an active mode from a power save mode at a scheduled time after a target beacon transmission time;
    means for performing at least one of a transmission of one or more data frames to a direct link peer or a reception of one or more data frames from a direct link peer;
    means for transmitting an end of service period indication upon completion of a data transmission;
    means for receiving an end of service period indication; and
    means for reentering the power save mode.

11. The apparatus of claim 10, further comprising means for transmitting a more data indication with each data frame transmitted between reception of two consecutive beacons, the more data indication indicating at least one of an end of data or an existence of additional data.

12. In a wireless communication system, an apparatus comprising:
    at least one processor configured to:
        switch a power management mode to an active mode from a power save mode;
        transmit a trigger frame to at least one direct link peer;
        obtain one or more data frames from the at least one direct link peer;
        receive an end of service period indication from the direct link peer;
        return the power management mode to the power save mode in response to receiving the end of service period indication; and
        receive a beacon after receiving the end of service period indication.

13. The apparatus of claim 12, wherein the processor is further configured to receive an acknowledgment indication in response to transmitting the trigger frame.

14. The apparatus of claim 12, further comprising receiving a more data indication with each of the one or more data frames from the at least one direct link peer, the more data indication indicating at least one of an end of data or an existence of additional data.

15. A method that facilitates power save operations, comprising:
    receiving, at a station, a trigger frame from a direct link peer transitioning from a power save mode;
    transmitting, by the station, an acknowledgment indication in response to receiving the trigger frame;
    transmitting, by the station, one or more data frames to the direct link peer; and
    conveying, by the station, an end of service period indicator to the direct link peer upon at least one of an expiration of a maximum service period or a complete transmission of buffered data frames.

16. The method of claim 15, wherein the one or more data frames are delivery enabled.

17. The method of claim 15, further comprising receiving at the station data frames from the direct link peer after transmitting the acknowledgment indication.

18. The method of claim 15, further comprising conveying a more data indication associated with each transmitted data frame, the more data indication indicating whether additional data is waiting to be transmitted.

19. A wireless communications apparatus, comprising:
    a memory that retains instructions related to:
        receiving a trigger frame from a direct link peer transitioning from a power save mode;
        transmitting an acknowledgment indication in response to receiving the trigger frame;
        transmitting one or more data frames to the direct link peer; and
        conveying an end of service period indicator to the direct link peer upon at least one of an expiration of a maximum service period or a complete transmission of buffered data frames; and
    a processor, coupled to the memory, configured to execute the instructions retained in the memory.

20. The wireless communications apparatus of claim 19, wherein the one or more data frames are delivery enabled.

21. The wireless communications apparatus of claim 19, wherein the memory further comprises instructions related to receiving at least one data frame from the direct link peer after transmitting the acknowledgment indication.

22. The wireless communications apparatus of claim 19, wherein the memory further retains instructions related to conveying a more data indication associated with each transmitted data frame, the more data indication indicating whether additional data is waiting to be transmitted.

23. A wireless communications apparatus that facilitates maintaining active direct transfers during power save, comprising:
    means for receiving a trigger frame from a direct link peer transitioning from a power save mode;

means for transmitting an acknowledgment indication in response to receiving the trigger frame;

means for transmitting one or more data frames to the direct link peer; and means for conveying an end of service period indicator to the direct link peer upon at least one of an expiration of a maximum service period or a complete transmission of buffered data frames.

24. In a wireless communication system, an apparatus comprising:

at least one processor configured to:

receive a trigger frame from a direct link peer transitioning from a power save mode;

transmit an acknowledgment indication in response to receiving the trigger frame;

transmit one or more data frames to the direct link peer; and convey an end of service period indicator to the direct link peer upon at least one of an expiration of a maximum service period or a complete transmission of buffered data frames.

* * * * *